(12) United States Patent
Jacobs et al.

(10) Patent No.: US 7,499,588 B2
(45) Date of Patent: Mar. 3, 2009

(54) LOW RESOLUTION OCR FOR CAMERA ACQUIRED DOCUMENTS

(75) Inventors: Charles E. Jacobs, Bellevue, WA (US);
James R. Rinker, Kirkland, WA (US);
Patrice Y. Simard, Bellevue, WA (US);
Paul A. Viola, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/850,335

(22) Filed: May 20, 2004

(65) Prior Publication Data

US 2005/0259866 A1  Nov. 24, 2005

(51) Int. Cl.
*G06K 9/18* (2006.01)
(52) U.S. Cl. .................. 382/182; 382/173; 382/229
(58) Field of Classification Search ............. 382/159, 382/173, 181, 182, 190, 224, 229, 156, 298, 382/312; 235/435; 715/243
See application file for complete search history.

(56) References Cited

U.S. PATENT DOCUMENTS

| | | | |
|---|---|---|---|
| 4,173,772 A | 11/1979 | White | |
| 5,048,097 A * | 9/1991 | Gaborski et al. | 382/156 |
| 5,455,875 A | 10/1995 | Chevion et al. | |
| 5,509,092 A | 4/1996 | Hirayama et al. | |
| 5,737,438 A | 4/1998 | Zlotnick et al. | |
| 6,128,606 A * | 10/2000 | Bengio et al. | 706/10 |
| 6,192,360 B1 | 2/2001 | Dumais et al. | |
| 6,438,265 B1 | 8/2002 | Neilper et al. | |
| 6,553,131 B1 * | 4/2003 | Neubauer et al. | 382/105 |
| 6,577,755 B1 | 6/2003 | Lorie | |
| 6,687,421 B1 | 2/2004 | Navon | |
| 6,687,697 B2 | 2/2004 | Collins et al. | |
| 6,735,335 B1 | 5/2004 | Liu et al. | |
| 6,738,512 B1 | 5/2004 | Chen et al. | |
| 2003/0164819 A1 * | 9/2003 | Waibel | 345/173 |
| 2003/0236104 A1 * | 12/2003 | Lin | 455/556.1 |

OTHER PUBLICATIONS

Zhang, et al. "A PDA based signal translator", IEEE pp. 1-6, 2002.*
Gader, et al. "Handwritten word recognition with character and inter-character neural networks", IEEE, pp. 158-164, 1997.*
Li, et al. "Building Pattern Classifiers Using Convolutional Neural Networks", IEEE, pp. 3081-3085, 1999.*
Tomai, et al. (Transcript Mapping for Historic Handwritten Document Images), IEEE, pp. 1-6, 2002.*
J.D. Hobby and T.K. Ho. Enhancing Degraded Document Images via Bitmap Clustering and Averaging. In Proc. of the 4th International Conference on Document Analysis and Recognition, pp. 394-400, 1997.

(Continued)

*Primary Examiner*—Daniel G Mariam
(74) *Attorney, Agent, or Firm*—Amin, Turocy & Calvin, LLP

(57) ABSTRACT

A global optimization framework for optical character recognition (OCR) of low-resolution photographed documents that combines a binarization-type process, segmentation, and recognition into a single process. The framework includes a machine learning approach trained on a large amount of data. A convolutional neural network can be employed to compute a classification function at multiple positions and take grey-level input which eliminates binarization. The framework utilizes preprocessing, layout analysis, character recognition, and word recognition to output high recognition rates. The framework also employs dynamic programming and language models to arrive at the desired output.

20 Claims, 22 Drawing Sheets

OTHER PUBLICATIONS

K. Jung. Neural network-based text location in color images. Pattern Recognition Letters. vol. 22, pp. 1503-1515, 2001.

P.Y. Simard, D. Steinkraus, and J.C. Platt. Best Practices for Convolutional Neural Networks Applied to Visual Document Analysis. International Conference on Document Analysis and Recognition, pp. 958-962, 2003.

Ali Zandifar, et al., A Video Based Interface to Textual Information for the Visually Impaired, ICMI'02, 2002, 6 pages.

Jin Wang, et al., Segmentation of Merged Characters by Neural Networks and Shortest-Path, ACM-SAC '93, Feb. 1993, pp. 762-769, IN, USA.

P. Patrick van der Smagt, A Comparitive Study of Neural Network Algorithms Applied to Optical Character Recognition, 1990, pp. 1037-1044.

M.D. Garris, et al., Analysis of a Biologically Motivated Neural Network of Character Recognition, 1991, pp. 160-175.

Zang and He. "Notetaking with a Camera: Whiteboard Scanning and Image Enhancement", submitted to ICASPP 2004.

Baird. Anatomy of a versatile page reader, IEEE Proceedings, Special Issue on OCR, Jul. 1992.

Baird. A Family of European Page Readers, Pattern Recognition, 1994. vol. 2 - Conference B: Computer Vision & Image Processing., Proceedings of the 12th IAPR International. Conference on, vol. 2, pp. 540-543, Oct. 9-13, 1994.

Bengio. "LeRoc: A NN/HMM Hybrid for On-Line Handwriting Recognition," Neural Computation, vol. 7, No. 6, pp. 1289-1303, 1995.

Bishop., Neural Networks for Pattern Recognition, Oxford University Press, (1995), pp. 230-252.

Doermann. (2004) Progress in Camera-Based Document Image Analysis, Proceedings Seventh ICDAR 2003. Edinburgh, Scotland, pp. 606-616.

Ittner and Baird. "Language-Free Layout Analysis,"Proc. IAPR 2nd Int'l Conf. on Document Analysis & Recognition, Tsukuba Science City, Japan, pp. 336-340, Oct. 1993.

Hornik. "Universal Approximation of an Unknown Mapping and its Derivatives using Multilayer Feedforward Networks" Neural Networks, v. 3, pp. 551-560, (1990).

Newman. (1999), CamWorks: A Video-based Tool for Efficient Capture from Paper Source Documents, Proc. in the ICMCS, pp. 647-653.

Sellen and Harper. The myth of the Paperless Office, MIT Press, 2001, pp. 14, 16 and 209-211.

Simard. Best Practice for Convolutional Neural Networks Applied to Visual Document Analysis, International Conference on Document Analysis and Recognition (ICDAR), IEEE Computer Society, Los Alamitos, pp. 958-962, 2003.

Taylor and Dance. "Enhancement of Document Images from Cameras", Proc. of IS/&T/SPIE EIDR V, pp. 230-241 1998.

Trier and Taxt. "Evaluation of Binarization Methods for Documents Images", Pami. vol. 17, No. 3, pp. 312-315, 1995.

Viola and Jones. "Rapid Object Detection using a Boosted Cascade of Simple Features", Proceedings IEEE Conf. on Computer Vision and Pattern Recognition 2001.

\* cited by examiner

LOW RESOLUTION OCR FOR CAMERA ACQUIRED DOCUMENTS

TECHNICAL FIELD

This invention is related to optical character recognition (OCR), and more specifically, to OCR software that improves the processing of documents imaged by low resolution devices.

BACKGROUND OF THE INVENTION

Technological advances in electronics are quickly reducing the size, weight, cost, and power consumption of cameras. Thus, mobile computing devices such as cell phones, PDAs, and notebook computers can capture information using small, inexpensive, low resolution digital cameras that are now designed as subcomponents thereof. Such cheap and versatile cameras currently make it possible to easily photograph a wide variety of documents without using cumbersome peripheral devices such as a scanner. Documents ranging from books and legal documents to bills and business cards can now be photographed instantaneously on cellphones, PDAs, and laptop computers.

However, optical character recognition (OCR) of such photographed documents presents a different challenge. Conversions from paper to digital representations and back are straightforward when utilizing desktop computers and suitable peripheral scanning devices. In contrast, the rapid evolution of technologies suitable for supporting mobile computing now makes imaging of such documents by such devices more complicated. For example, it is fairly difficult to print and scan documents, when untethered to a suitable peripheral device. Mobile printers are heavy, power hungry, and expensive. Portable scanners are equally unwieldy. Moreover, these low resolution cameras, whether standalone or embedded in a mobile computing device, present a new challenge to the OCR of such photographed documents. Traditional printed character systems proceed by first binarizing the image, segmenting the character, and then recognizing the characters. Because these systems separate the steps, much lower recognition rates are achieved than desired thereby mitigating the incentive to use such device capabilities. The OCR process is much more complicated when using these low resolution cameras because it is virtually impossible to do quality binarization or character segmentation independent of the recognition process. Segmentation is where the OCR engine organizes the pixels of a pixelated scanned image into characters.

If such a mobile technology can now be provided the OCR capability of capturing and processing the document data, it is expected that people will use the cameras therein to take pictures of many different types of documents, ranging from restaurant bills, interesting articles, reports, book covers, business cards, screen shots, slides projected on a wall, maps, etc. The incentive to capture a wide variety of documents is high, since such digital documents can later be massively stored, indexed, archived, edited, and even printed back, once in electronic form. Additionally, for the information worker, this presents a wealth of opportunities.

Current cheap cameras (e.g., about $50) do not provide sufficient resolution to capture a whole document page at 11-point font in one exposure and perform character segmentation independently of character recognition. Low-resolution camera images are so blurry and of such poor quality that binarization, segmentation, and recognition cannot be performed independently, and still maintain high recognition rates. For instance, at low resolution, the middle column of character "o" is often a better candidate for being cut than many other such cuts between letters. One cannot hope for good performance without addressing the segmentation problem effectively. Improvements in low resolution OCR benefit high resolution cameras as well, thereby allowing users to take pictures from further away and out of focus.

Thus, what is needed is an OCR capability that can resolve low resolution symbols.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that solves these problems simutaneously by combining a machine learning technology (e.g., a convolutional neural network), dynamic programming, and a language model that in combination, provide the necessary steps to achieve low resolution OCR capabilities for camera-acquired symbols and documents. The use a machine learning approach based on convolutional neural network and trained on a large amount of data facilitates maximum robustness.

The present invention is composed of several parts that work together to recognize symbols on a photographed page. The convolutional neural network-based character recognizer is used to predict what characters are likely to be present at a given location in the input image. A global layout analysis component performs the task of finding the locations of the lines of text on the page, and returning a list of bounding rectangles for these lines of text. The layout analyzer further breaks down the lines into individual words, indicating the bounds for each word. Tying all of these together is the word recognizer that finds the most likely word inside a given rectangle on the page. Word recognition is an optimization problem solved using dynamic programming.

In another aspect of the present invention an algorithm is provided that detects lines of text directly from the grey level image.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 13 illustrates sample text processed for line extraction using gap detection, in accordance with the present invention.

DETAILED DESCRIPTION OF THE INVENTION

Figure 1:
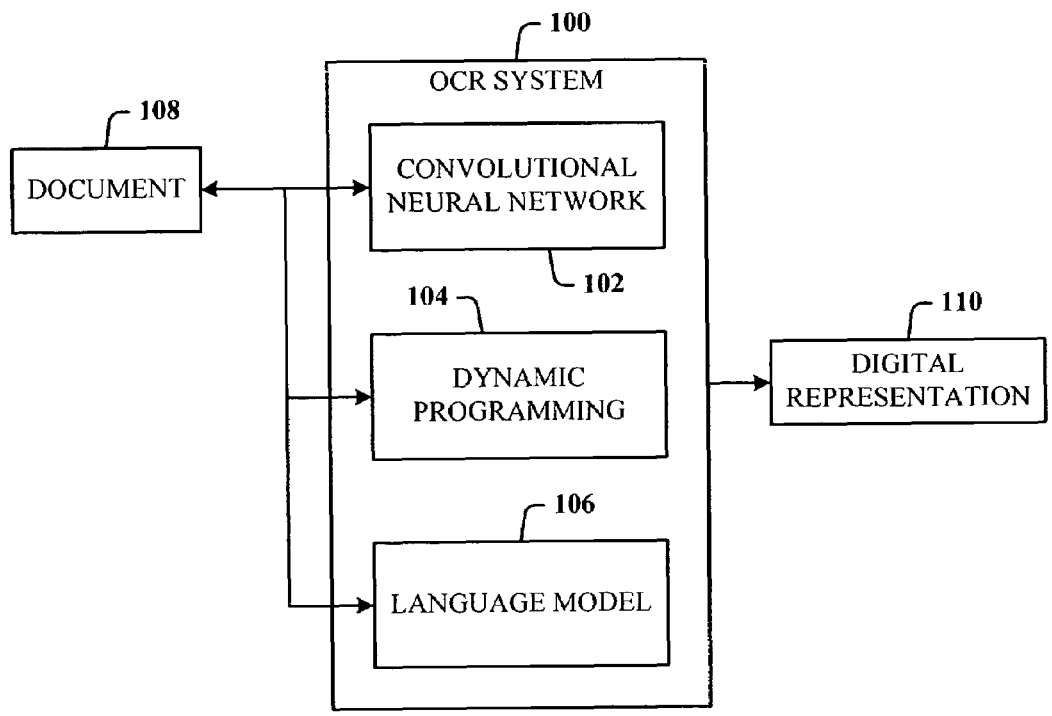
FIG. 1 illustrates a system that is a global optimization framework for low resolution OCR of camera acquired documents in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

OCR of Camera Acquired Documents

The present invention facilitates the capture and accurate optical character recognition (OCR) of symbols and text when using low resolution symbol and/or document images. Such capability also finds application to scenarios involving degraded symbols, text, and/or documents, which medium has been damaged or tainted in some manner, and the associated symbols more difficult to recognize.

Referring now to FIG. 1, there is illustrated a system 100 that is a global optimization framework for low resolution OCR of camera acquired documents in accordance with the present invention. The system 100 solves the problem in the prior art by simultaneously combining at least a convolutional neural network 102, a dynamic programming component 104, and a language model 106. Thus, for a document 108 that is captured and processed by the system 100, the recognition rate is very high resulting in an output digital representation 110 suitable to the user.

The convolutional neural network 102 can efficiently compute a classification function at multiple positions by reusing partial results of one position in the adjacent position's computation. This is further facilitated, since a neural network can process a grey-level input. A robust system is provided using a machine learning approach that is trained on a large amount of data. The convolutional neural network 102 is employed because it efficiently computes a classification function at multiple positions, scales well with large amounts of training data, outputs probabilities that makes it easy to combine with a Hidden Markov Model (HMM) algorithm, and it takes grey-level input, which make binarization unnecessary. By collecting data in different lighting conditions, fonts, sizes, cameras, angle, focus, etc., the machine learning algorithm performs the task of building a classifier invariant to these factors.

The dynamic programming component 104 is utilized to solve optimization of word recognition. A word recognizer uses the dynamic programming component 104 to determine which word is located at a given word bounding rectangle returned by layout analysis. Dynamic programming finds an optimal solution for a problem by building up a series of optimal solutions for subproblems of the original problem. This facilitates the reuse of much of the computation for finding optimal subproblems when determining the global optimal solution.

The language model component 106 facilitates character and word recognition.

Figure 2:
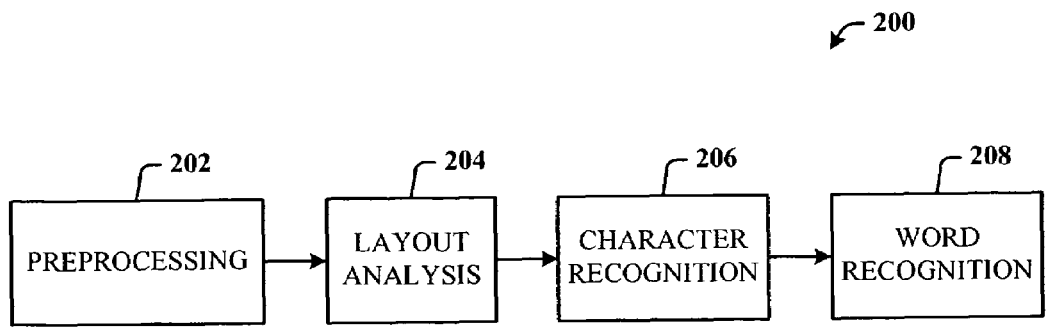
FIG. 2 illustrates a flow diagram of the principal operations of the low resolution OCR system of the present invention.

Referring now to FIG. 2, there is illustrated a flow diagram of the principal operations 200 of the low resolution OCR system of the present invention. First, a preprocessing function 202 is performed to capture a document image in preparation for further processing. A global layout analysis function 204 performs the task of finding the locations of the lines of text on the captured document, and returning a list of bounding rectangles for these lines of text. Then the layout analyzer further breaks down the lines into individual words, indicating the bounds for each word. A character recognizer 206 is employed to predict what character is likely to be present at a given location in the input image. In one implementation, a convolutional neural network-based character recognizer is used to facilitate character recognition and other functions. Tying all of these together is a word recognizer 208 that finds the most likely word inside a given rectangle on the document. Word recognition is an optimization problem that is solved using dynamic programming.

Figure 3:
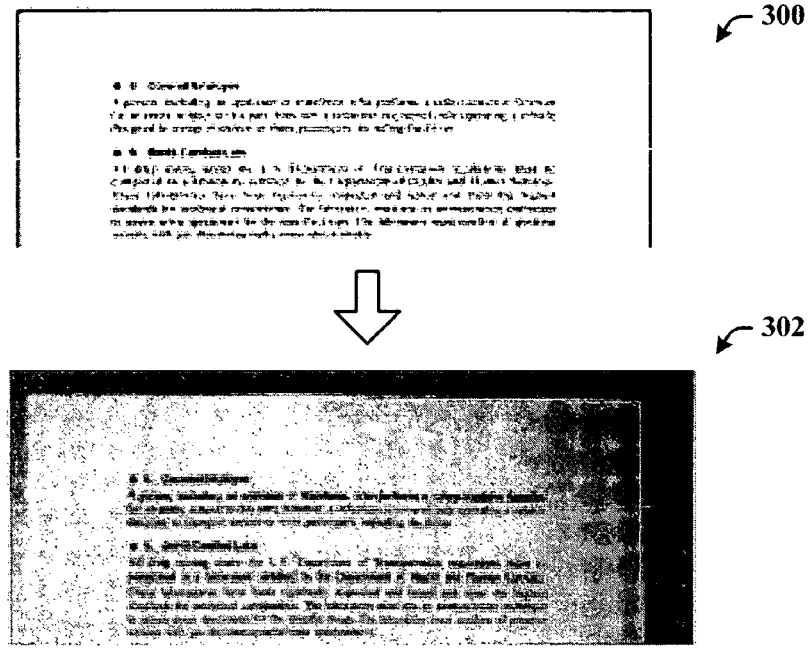
FIG. 3 illustrates a sample of a raw document and the imaged document after capture using a camera.

Referring now to FIG. 3, there is illustrated a sample of a raw document 300 and the imaged document 302 after capture using a camera. The imaged document 302 exhibits a darker background color and blurred text in response to the low resolution capabilities of the camera.

Preprocessing

Figure 4:
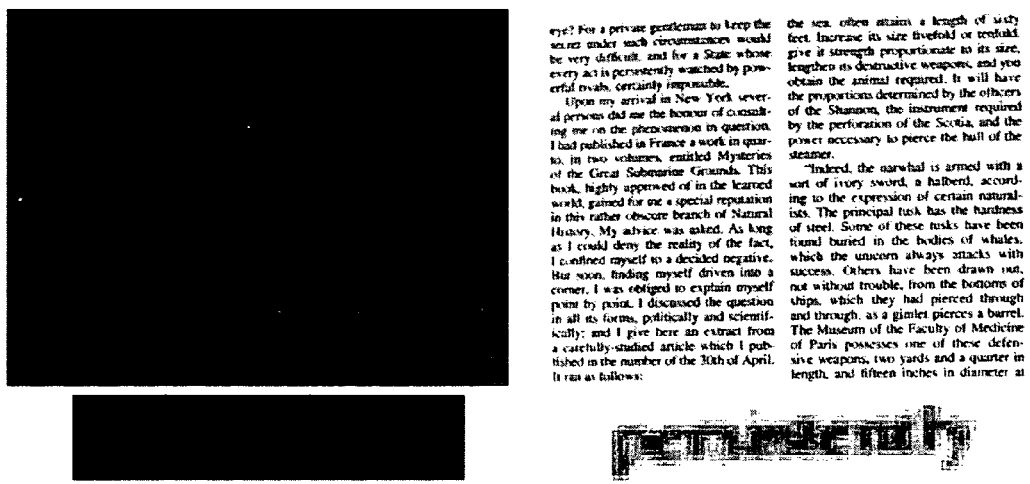
FIG. 4 illustrates sample text and a word of a document before and after preprocessing, in accordance with the present invention.

Referring now to FIG. 4, there is illustrated sample text and a word of a document before and after preprocessing, in accordance with the present invention. A scanned document can exhibit a number of problems that would be typically be encountered when a user captures the document using a camera (e.g., a webcam). For example, if the camera was too close to the document, had the incorrect rotational and focal axis alignment relative to the surface of the document, and incorrect or uneven lighting. Rotational alignment causes the lines of text to not be perfectly horizontal in the image. Perspective warp introduces distortion due to perspective when the camera does not face the document straight on. Additionally, barrel distortion can occur due to relatively poor quality optics. Some of the lighting problems are alleviated by preprocessing the images with an adaptive whitebalancing algorithm that strives to maximize contrast locally over regions or blocks in the image. This process can be run each time a document image is presented to the system for OCR processing.

Training

Figure 5:
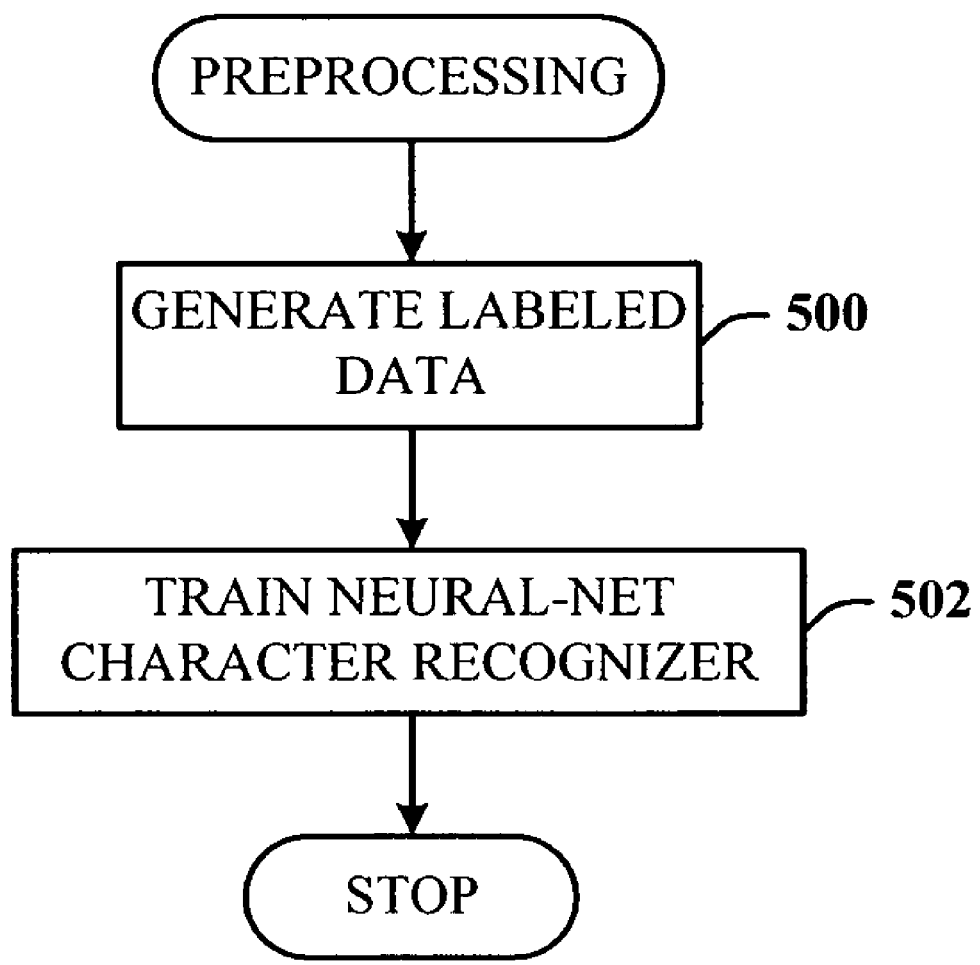
FIG. 5 illustrates one methodology for preprocessing training in accordance with the present invention.

Referring now to FIG. 5, there is illustrated one methodology for preprocessing training in accordance with the present invention. While, for purposes of simplicity of explanation, the one or more methodologies shown herein, e g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The following preprocessing is different than that of FIG. 4, in that it is performed once to initialize the neural net-based system. At 500, a labeled data is generated. At 502, the neural-net character recognizer is trained. The process then reaches a Stop block. To train the neural network-based character recognizer, a large corpus of labeled training data is required. Such a corpus could be built by having a human annotate scanned pages, and identifying the location and ASCII code for each character on the page. However, this can be a very time-consuming and error-prone process. Thus, a semi-automated mechanism is provided to generate the labeled data.

Figure 6:
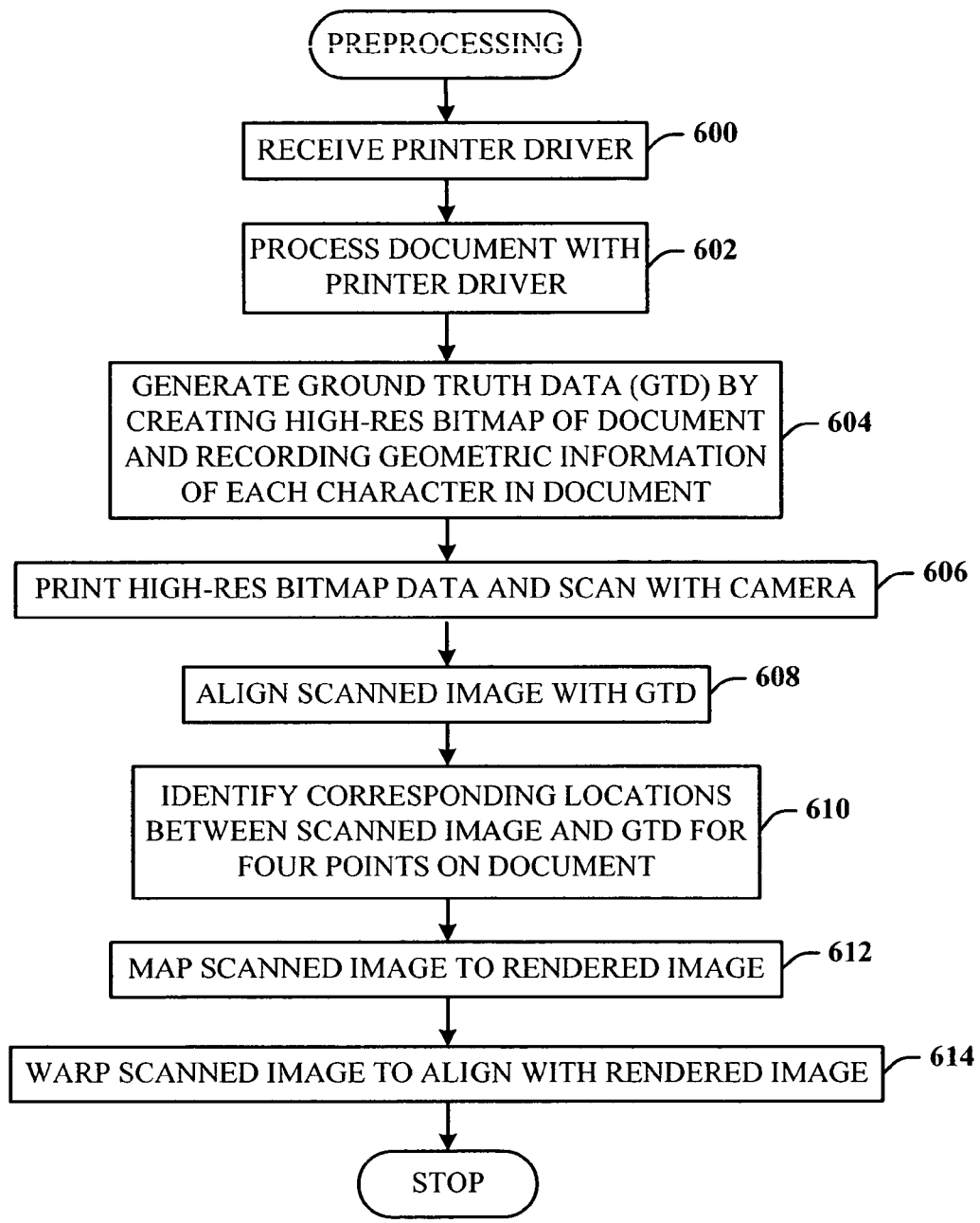
FIG. 6 illustrates a flow chart of a preprocess for generating labeled data in accordance with the present invention.

Referring now to FIG. 6, there is illustrated a flow chart of a preprocess for generating labeled data in accordance with the present invention. The data acquisition system of the present invention consists of a special printer driver that records the bounding box and character code for each of the characters on a page, and a tool to help align these bounding boxes with a scanned image. At 600, the printer driver is provided. At 602, the document is processed with the printer driver. At 604, ground truth data (GTD) is generated by creating a high resolution bitmap of the document and recording the geometric information for each character on the document. The document and the high resolution bitmap are the "ground truth," where each character is correctly labeled and its position known. At 606, the high-resolution bitmap is printed and scanned in with the camera system. At 608, the scanned image is aligned to the ground truth bitmap in order to get the position for each of the characters on the scanned page. In order to do this rectification step, at 610, corresponding locations between the scanned image and the ground-truth bitmap are identified for each of four points on the document. At 612, the best-fitting perspective transformation is computed to map the scanned image to the rendered image. At 614, the scanned image is warped, if necessary, to align to the rendered image. The process then reaches a Stop block.

Unfortunately, using a perspective transformation to rectify scanned images is not always sufficient to align the bounding boxes to the scanned characters. To improve the matches, each character is translated by up to five pixels in each direction, and the best match is recorded using a least squares distance measure. The corresponding offset bounding boxes are then used as the location in the warped, scanned image for each training example.

Figure 7:
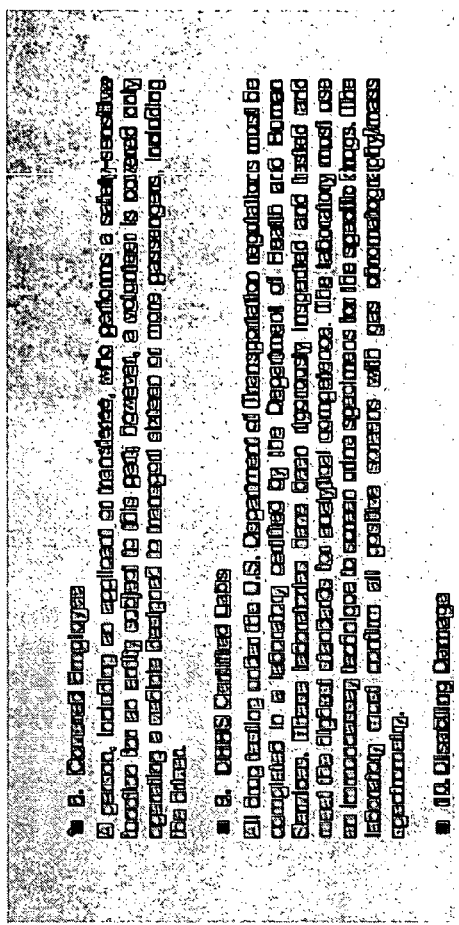
FIG. 7 illustrates sample text that has been scanned and aligned to the ground truth bitmap.

Referring now to FIG. 7, there is illustrated sample text that has been scanned and aligned to the ground truth bitmap. Shown, is the result of using the perspective transformation (described in FIG. 6) to align the character bounding boxes to the scanned image. The scanned text 700 is aligned to the ground truth data 702.

Layout Analysis

Figure 8:
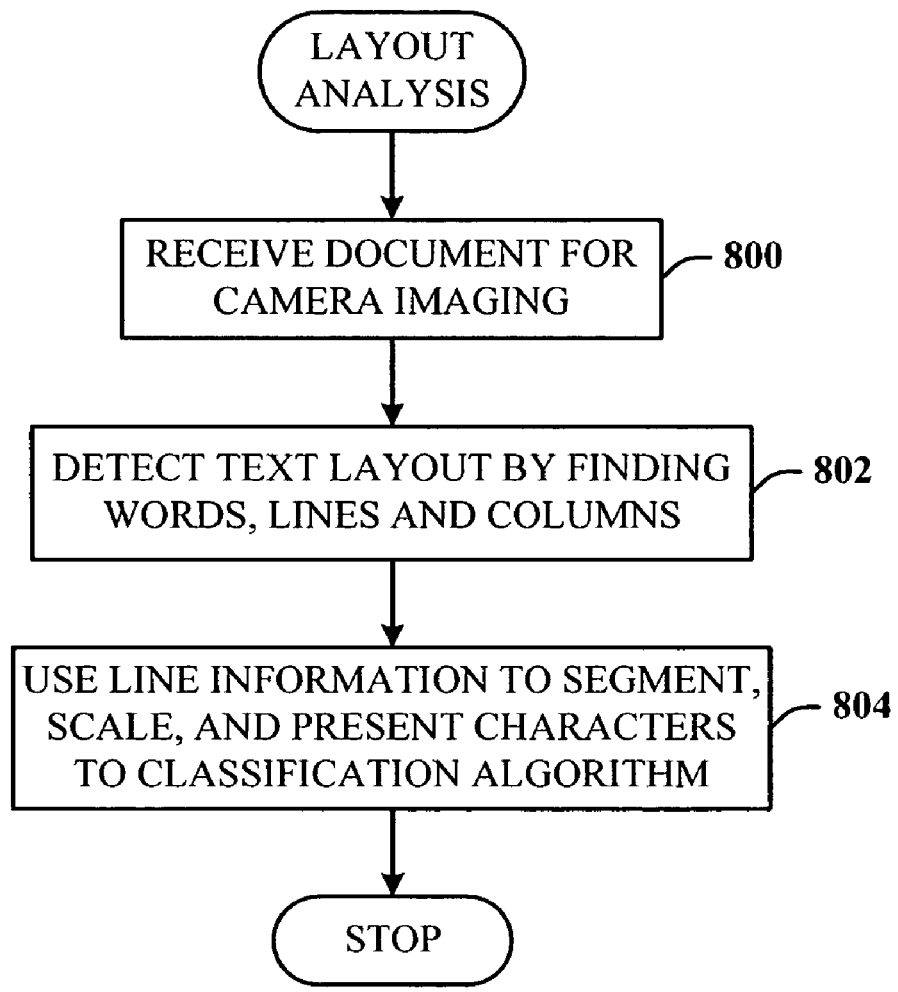
FIG. 8 illustrates a methodology for layout analysis in accordance with the present invention.

Referring now to FIG. 8, there is illustrated a methodology for layout analysis in accordance with the present invention. At 800, a document is received for imaging by a camera. At 802, layout analysis detects the layout of text on the page by finding the words, lines, and columns. Using line information, the characters along the line can be segmented, scaled, and presented to a character classification algorithm, as indicated at 806. The process then reaches a Stop block. In a scanned image, this sort of layout analysis can proceed using simple, yet reliable image processing operations such as connected components analysis. These connected components are then used as the basic inputs to the layout process.

As indicated previously, document images captured from a camera in an office environment are quite different from documents imaged on a peripheral computing device such as a scanner. The lighting used in the photographs is uncontrolled resulting in large variations of contrast and brightness. These variations present a challenge for simple text detection algorithms. Connected components analysis requires a binary image (i.e., black and white) as input. Thus, it can be difficult to construct an adaptive thresholding algorithm that reliably separates the text from the background paper. Variations in both contrast and intensity can cause some of the text to disappear into the background while other text was merges into very large blocks of characters.

Figure 9:
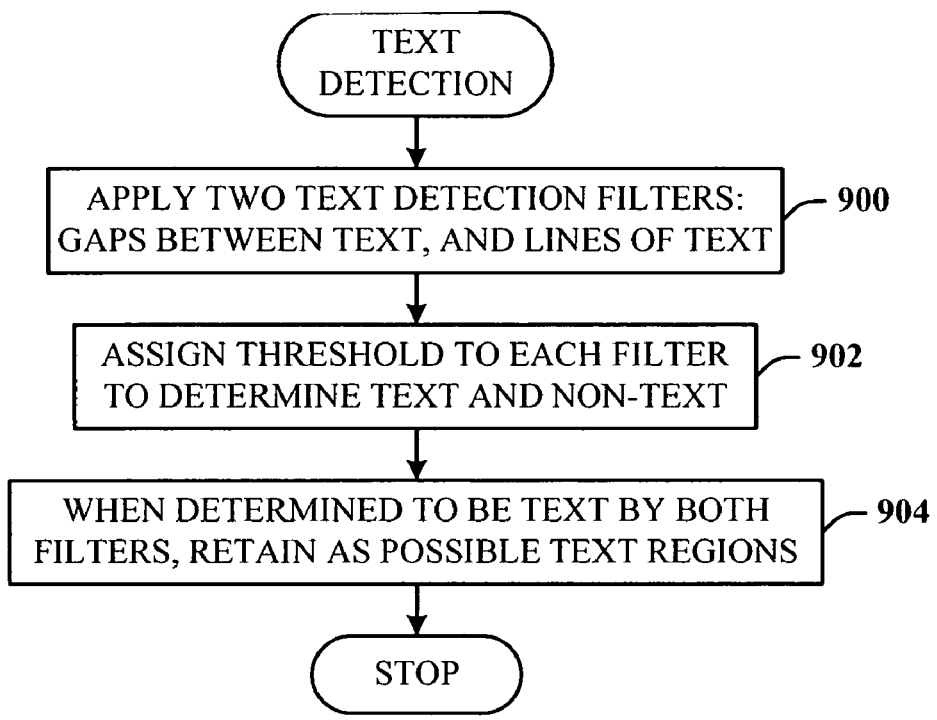
FIG. 9 illustrates a flow chart of a methodology for text detection in accordance with the present invention.

Referring now to FIG. 9, there is illustrated a flow chart of a methodology for text detection in accordance with the present invention. In one implementation, text detection proceeds as follows. At 900, two linear filters are applied to each location in the input image. At 902, each filter is assigned a threshold. Locations whose value is above this threshold are called "text", those below are "non-text". At 904, locations that are determined to be text by both filters are used and retained as possible text regions. The process then reaches a Stop block.

In one implementation, the thresholds were determined experimentally (100 and 6000, for a line height of seven pixels and a character gap of one pixel). In another implementation, additional features can be incorporated and the thresholds can be computed automatically using "boosting." Boosting is a general method for improving the performance of any learning algorithm that consistently generates classifiers which need to perform only slightly better than random guessing.

Figure 10:
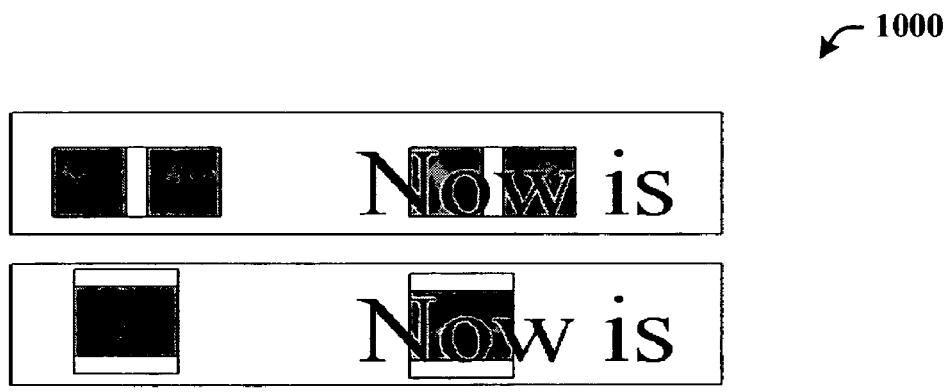
FIG. 10 illustrates a diagram that represents a result of the text detection filters, in accordance with the present invention.

Referring now to FIG. 10, there is illustrated a diagram 1000 that represents a result of the text detection filters, in accordance with the present invention. The first filter operates on the text "Now is" to find the gaps between the characters. Here, a gap is detected between the letters "o" and "w". The second filter operates on the same text to find the associated lines. Thus, the second filter detects the spaces above and below the word "Now".

Figure 11:
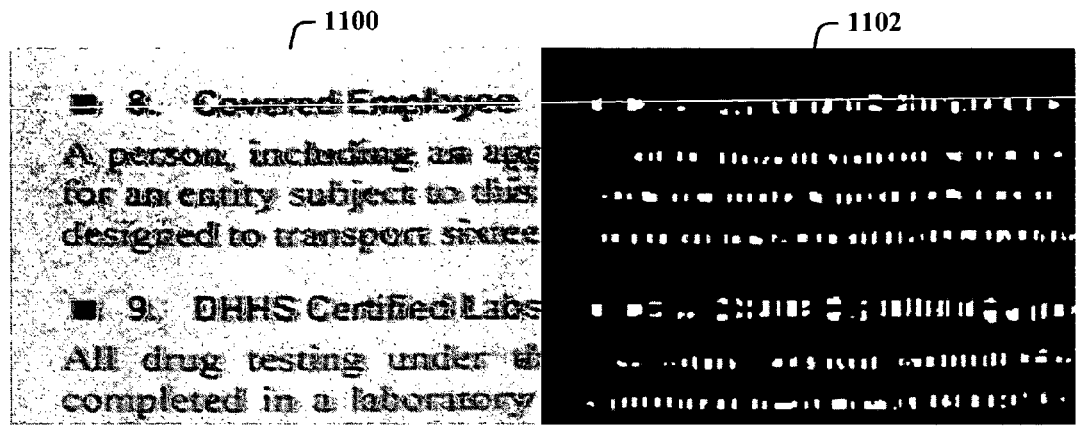
FIG. 11 illustrates an original camera image in comparison to an output of the text detector added to the camera image, as in a second rendering, in accordance with the present invention.

Referring now to FIG. 11, there is illustrated an original camera image 1100 in comparison to an output of the text detector added to the camera image, as in a second rendering 1102, in accordance with the present invention. The white areas of the second rendering indicate detected text.

Figure 12:
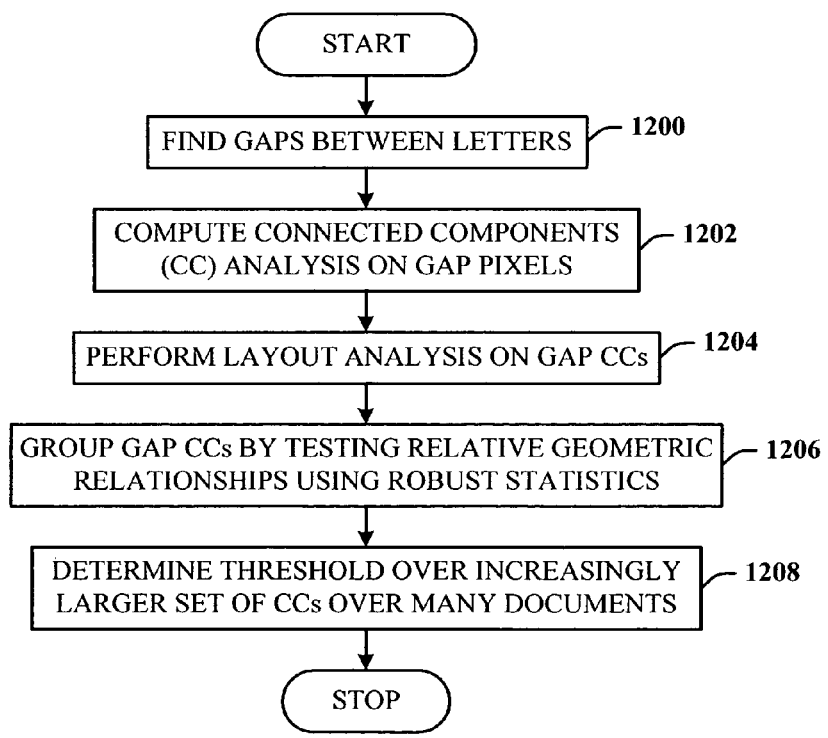
FIG. 12 illustrates a flow chart of a process for detecting gaps between letters, in accordance with the present invention.

Referring now to FIG. 12, there is illustrated a flow chart of a process for detecting gaps between letters, in accordance with the present invention. The result is that both filters roughly detect gaps between characters, as indicated at 1200. At 1202, a connected components (CC) analysis is computed on the "gap pixels". At 1204, layout analysis is performed on the resulting "gap CCs". The gap CCs are then grouped by testing their relative geometric relationships, as indicated at 1206. For instance, if gap CCs are relatively the same size and, are horizontally close and aligned, a line is detected. The tests use robust statistics, such as the median heights and widths of the CCs in the current line, and the algorithm performs multiple passes. At 1208, thresholds are determined over an increasingly larger set of CCs and over many documents. The process then reaches a Stop block.

As the statistics are collected on an increasingly large set of CCs, the grouping tests are done more aggressively. The thresholds are determined experimentally over a corpus of dozens of documents. Given the gap CCs, the line detection step is invariant to scale and alphabet because only the relative positions of the bounding boxes of the gap CCs are compared.

Figure 13:
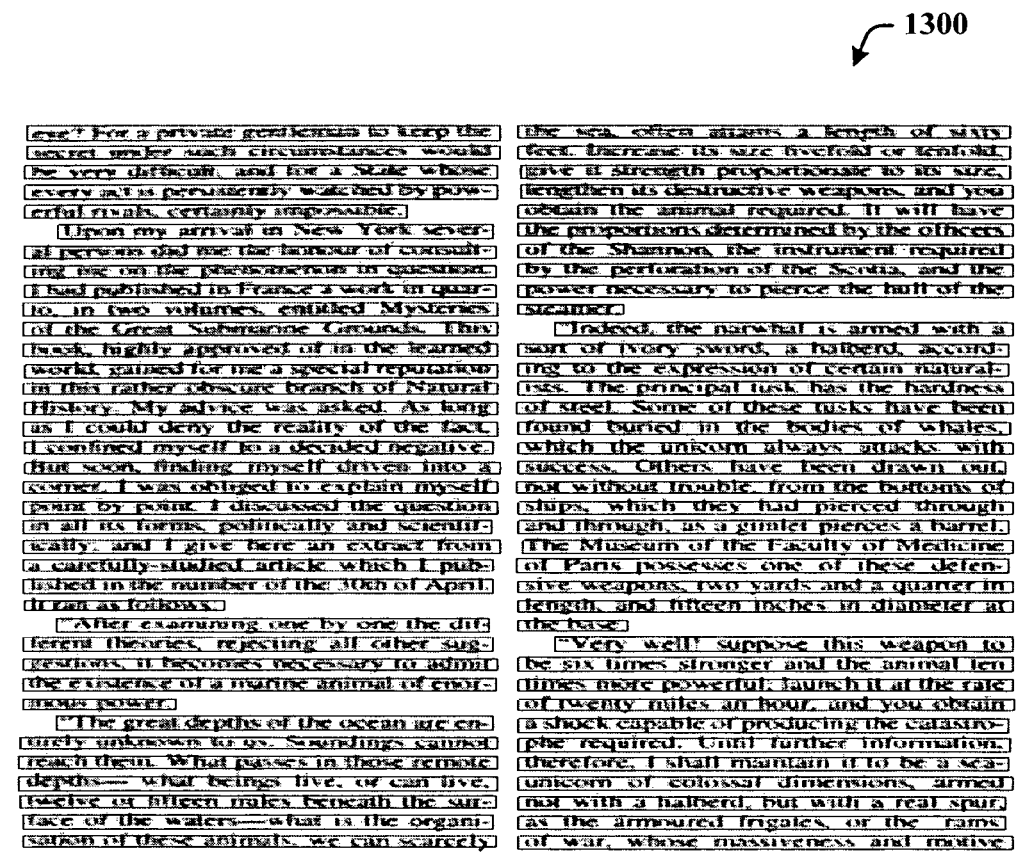

Referring now to FIG. 13, there is illustrated sample text 1300 processed for line extraction using gap detection, in accordance with the present invention. In essence, the system circumscribes a detected line of text with a bounded rectangle. In this two-column document, line detection results in each detected line of each column being circumscribed with the bounded rectangle. If it were a single column document, each line of text stretching across the page would be circumscribed with the bounded rectangle, indicating that the line was detected.

Figure 14:
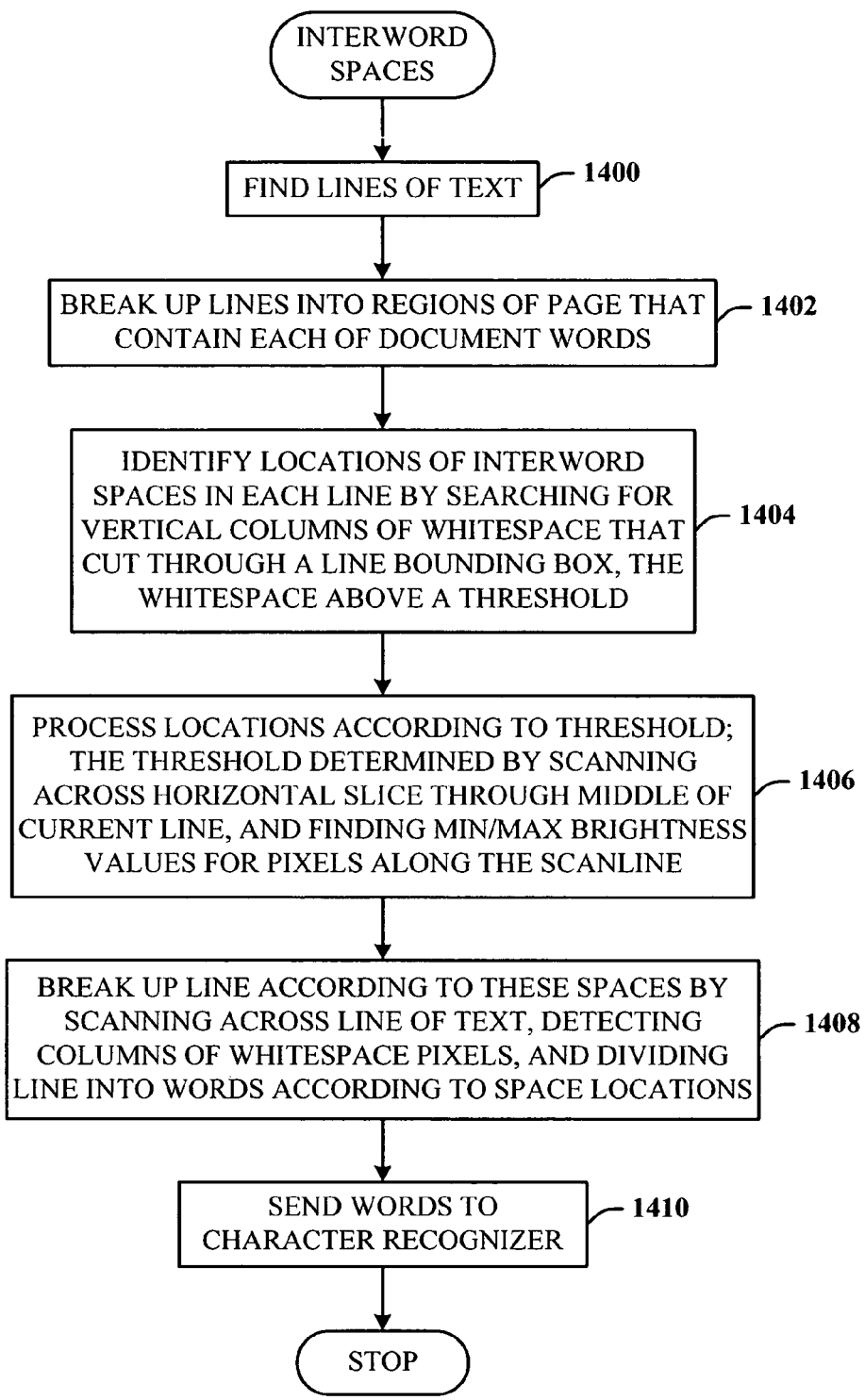
FIG. 14 illustrates a methodology for detecting interword spaces, in accordance with the present invention.

Referring now to FIG. 14, there is illustrated a methodology for detecting interword spaces, in accordance with the present invention. At 1400, the lines of text are detected. After the lines of text have been detected, these lines are further broken up into the regions of the page that contain each of the words in the document, as indicated at 1402. The locations of the interword spaces in each line are identified, and line is broken up using these spaces, as indicated at 1404. To find the spaces, vertical columns of whitespace that cut through a line's bounding box are detected. At 1406, a column is classified as whitespace if all of the pixels in that column are brighter than some threshold. The threshold is determined by scanning across a horizontal slice through the middle of the current line, finding the minimum and maximum brightness values for pixels along this scanline, and computing a threshold therefrom. In one implementation, a pixel whose brightness is greater than (minBrightness+3*maxBrightness)/4, is classified as a whitespace pixel. At 1408, the space finder then scans across the line of text detecting columns of whitespace pixels, and uses these space locations to divide the line into words. At 1410, the words are then sent to the character recognizer. The process then reaches a Stop block.

Character Recognizer

Figure 15:
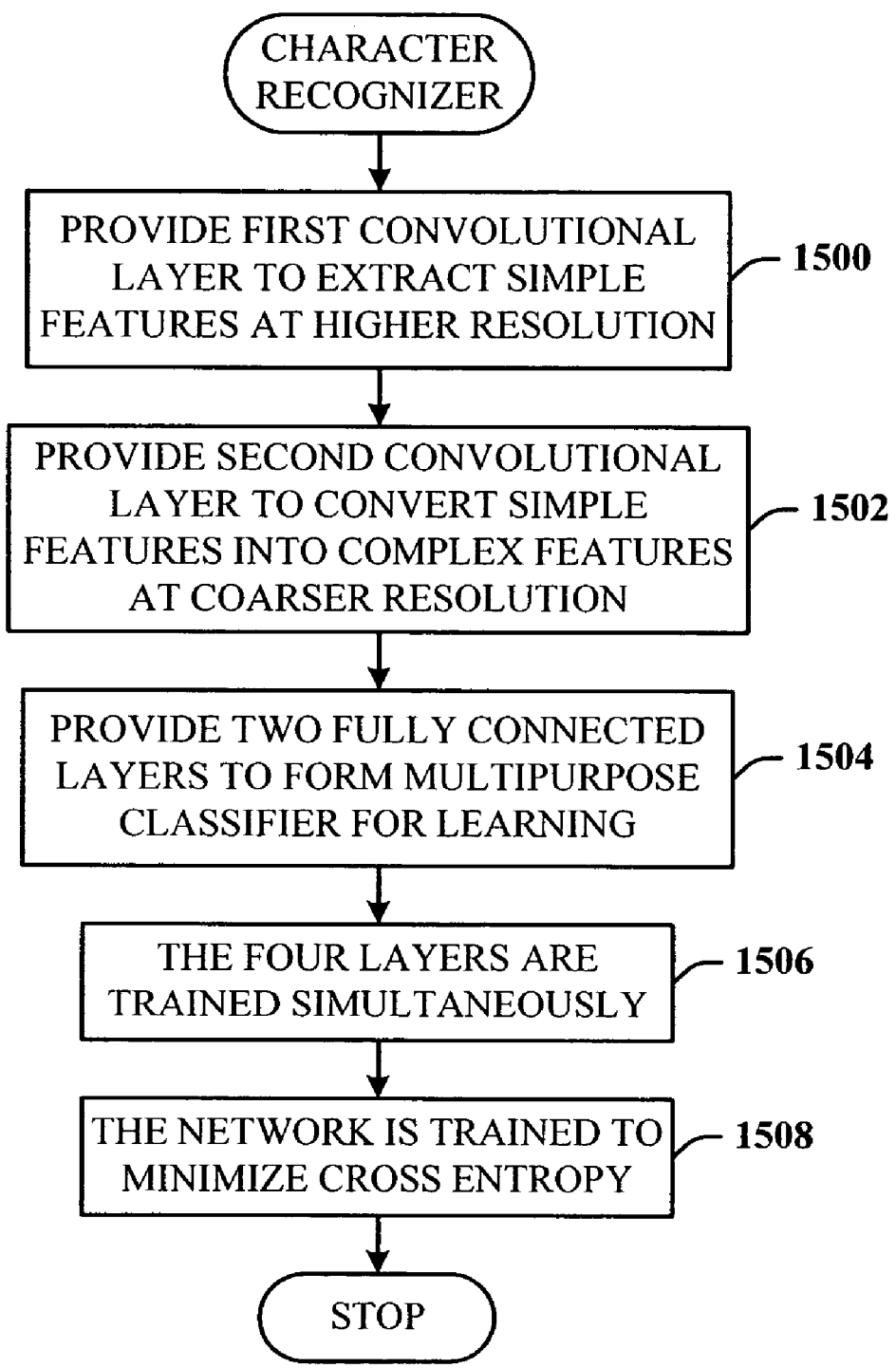
FIG. 15 illustrates a flow chart of one implementation for training a convolutional neural network in accordance with the present invention.

Referring now to FIG. 15, there is illustrated a flow chart of a process for training a convolutional neural network-based character recognizer in accordance with the present invention. At the core of the low resolution OCR system is the convolutional neural network-based character recognizer. At 1500, a first convolutional layer is provided to extract simple features at a higher resolution. At 1502, a second convolutional layer is provided to convert the simple features into complex features at a coarser resolution. At 1504, two additional fully connected layers are provided to form a multipurpose classifier for learning. At 1506, the four layers are trained simultaneously. At 1508, the network is trained to minimize cross entropy. The process then reaches a Stop block.

Figure 16:
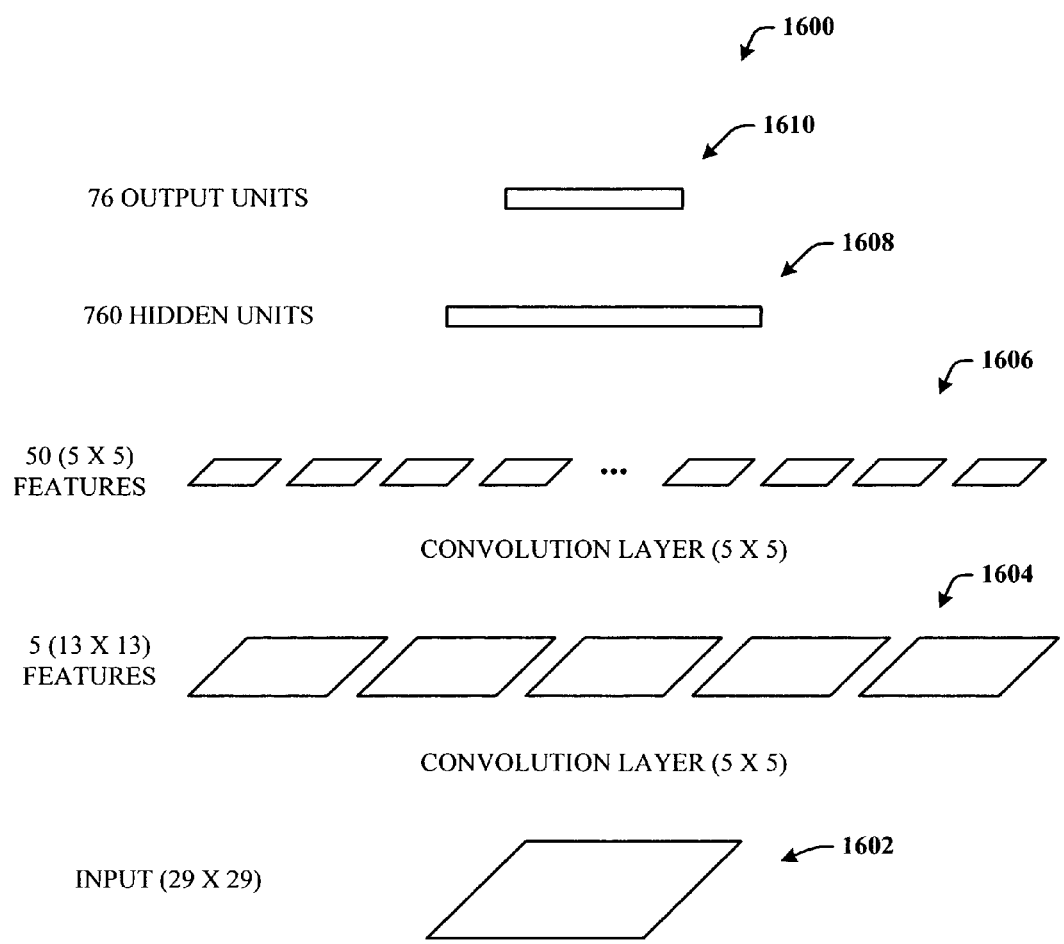
FIG. 16 illustrates a flow chart of a process for recognizing characters using a convolutional neural network-based character recognizer in accordance with the present invention.

Referring now to FIG. 16, there is illustrated a diagram of the convolutional neural network 1600 for low-resolution printed text OCR in accordance with the present invention. A general strategy of a convolutional network is to extract simple features at a higher resolution, and then convert the simple features into more complex features at a coarser resolution. One way to generate coarser resolution is to subsample a layer by a factor of two. The network 1600 includes an input image 1602 having a 29×29 pixel receptive field for receiving data. A first layer 1604 typically extracts very coarse features such as X and Y derivative, low pass, and X-Y derivative. The first layer 1604 scans the input image 1602 using five 13×13 pixel feature detector neurons (or maps). Because the features are learned on the data, it is difficult to predict what they will actually yield until training has been accomplished. A second convolutional layer 1606 extracts much more complex features at a coarse resolution. The second layer 1606 scans the output of the first layer 1604 using fifty 5×5 pixel feature detector neurons. The number of features is not ciritcal, as ong as there are enough features to carry the information to the classification layers (1608 and 1610). At this point, the features are difficult to interpret because they are distributed on so many units. It can be hypothesized that the features are loops, intersection, curvature, etc. The first two layers (1604 and 1606) can be viewed as a trainable feature extractor. The last two layers (1608 and 1610) are fully connected, and can be viewed as forming a multipurpose classifier, since a 2-layer fully connected neural network can learn any function. The four layers (1604, 1606, 1608, and 1610) are trained simultaneously. The network 1600 is then trained to minimize cross-entropy.

Previous experiences with this convolutional architecture indicates that in one implementation, a choice of five features for the first convolutional layer 1604 and fifty features for the second convolutional layer 1606 are adequate for a wide range of image-based character recognition, including low-resolution printed OCR of the present invention. In this implementation, seventy-six output units and seven hundred sixty hidden units for the fully connected layers (1608 and 1610) were used. The number of hidden units is variable, and it is by controlling this number that the capacity and generalization of the overall classifier is controlled. However, it is to be appreciated by one skilled in the art that other values can be employed for further optimization.

Figure 17:
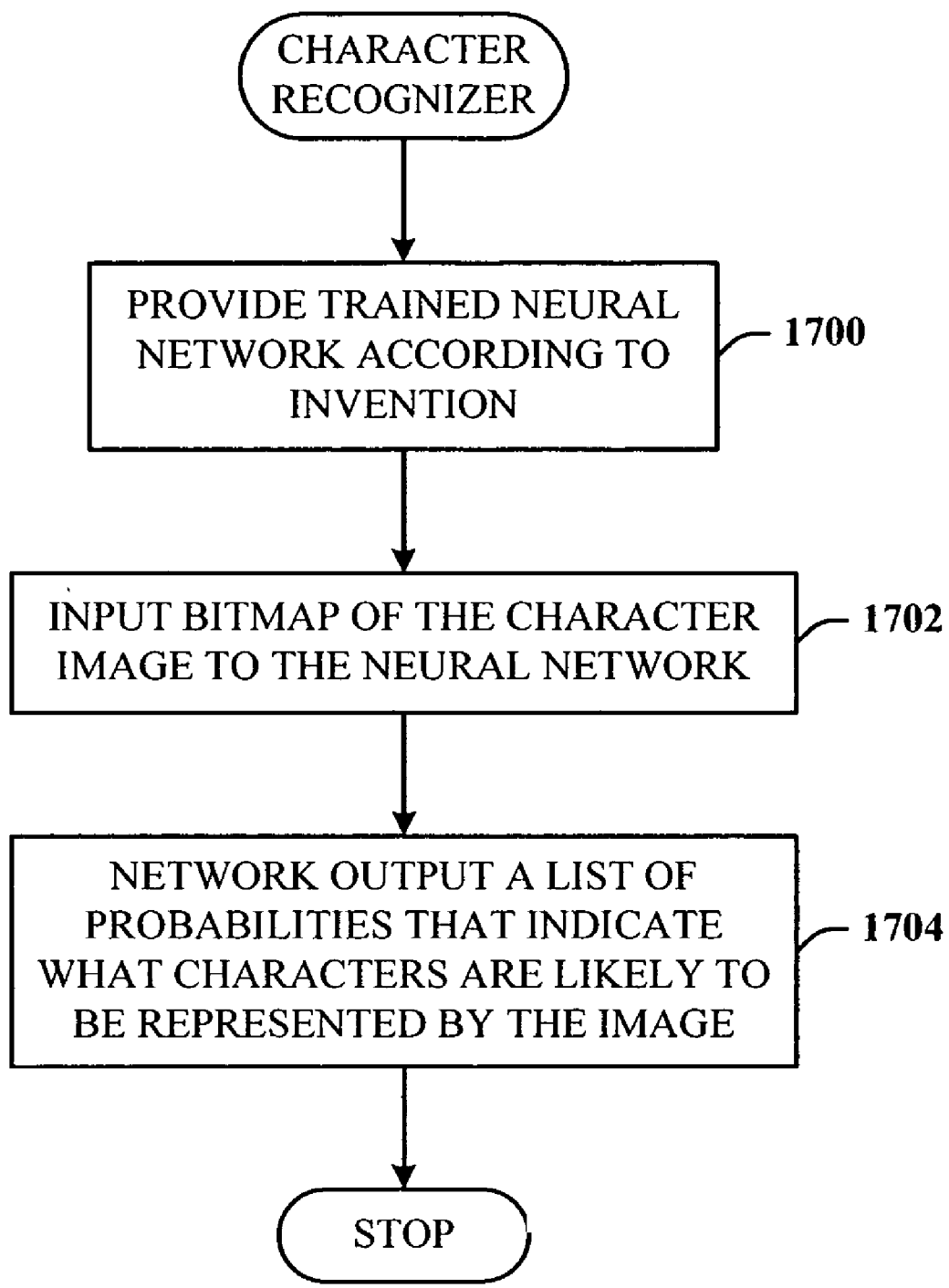
FIG. 17 illustrates a diagram of the convolutional neural network for low resolution printed text OCR in accordance with the present invention.

Referring now to FIG. 17, there is illustrated a flow chart of a process for recognizing characters using a convolutional neural network-based character recognizer in accordance with the present invention. At 1700, a trained neural network is provided. At 1702, a bitmap of character image is input. In this case, the bitmap is the 29×29 pixel receptive field. At 1704, the network outputs a list of probabilities that indicates what characters are likely to be represented by the image. The process then reaches a Stop block.

Figure 18:
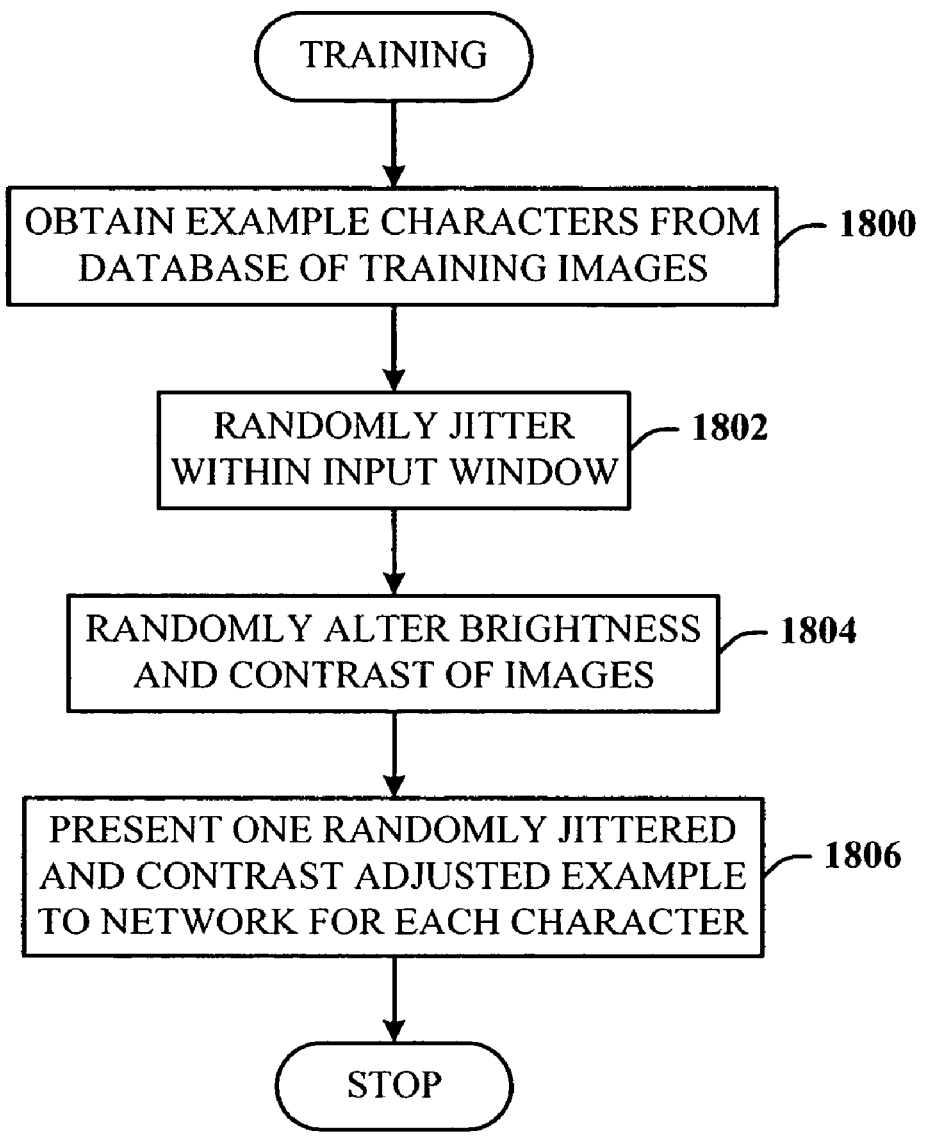
FIG. 18 illustrates a training methodology for the convolutional neural network in accordance with the present invention.

Referring now to FIG. 18, there is illustrated a training methodology for the convolutional neural network in accordance with the present invention. At 1800, the system is trained by taking example characters from a database of training images. Next, at 1802, the training images are randomly jittering within the input window. At 1804, the brightness and contrast of the training images are randomly altered. At 1806, for each epoch (or exposure to complete set of patterns) of training, one randomly jittered and contrast-adjusted example of each character is presented to the network. The process then reaches a Stop block. In one implementation, the training database contains 57,555 characters taken from fifteen pages of document text.

Word Recognizer

Figure 19:
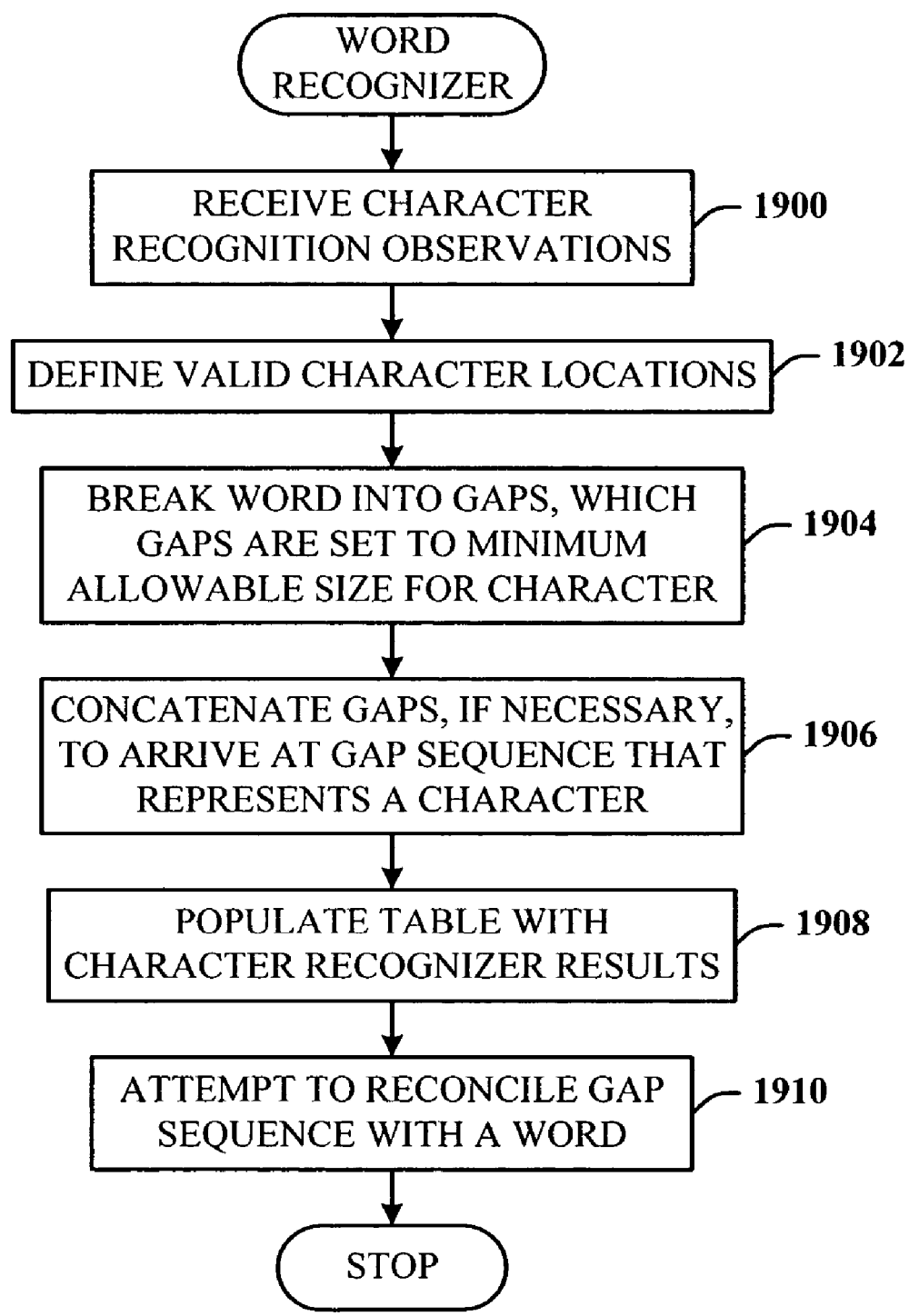
FIG. 19 illustrates a dynamic programming methodology for recognizing a word in accordance with the present invention.

Referring now to FIG. 19, there is illustrated a dynamic programming methodology for recognizing a word in accordance with the present invention. The character recognizer provides, at each location, the probability for each character to be present and centered in the input window of the neural network. The layout analyzer identifies the bounding rectangles of each word on the page. Unfortunately, the locations for the individual letters on the page are unknown, thus, centering of the character recognizer over each character to read off its best guess is not possible. Indeed, the character recognizer will happily report which 'letter' is most likely for any given bitmap, whether or not it is actually a letter.

At 1900, a series of character recognizer observations is received at the input to the word recognizer. The observations are made by scanning through the word and invoking the character recognizer at each possible valid character location. At 1902, valid character locations are defined. To define the valid character locations, the system breaks the word into small pieces, or gaps, which are set to be the minimum possible size allowed for a character, as indicated at 1904. In one implementation, the gaps are two pixels wide. Since the word is divided into gaps representing the minimum possible size for a character, a number of gaps (e.g., merging up to four gaps) may need to be concatenated together to find a combined sequence of gaps that represents a letter, as indicated at 1906. At 1908, a table is populated with the results of the character recognizer for all valid sequences of gaps. At 1910, the word recognizer then attempts to reconcile this sequence of recognizer outputs with a particular word. The process then reaches a Stop block.

The word recognizer uses a dynamic programming algorithm to determine which word is located at a given word-bounding rectangle returned by the layout analysis step. Dynamic programming finds an optimal solution for a problem by building up a series of optimal solutions for subproblems of the original problem. This allows the reuse of much of the computation for finding optimal subproblems when determining the global optimal solution.

Figure 20:
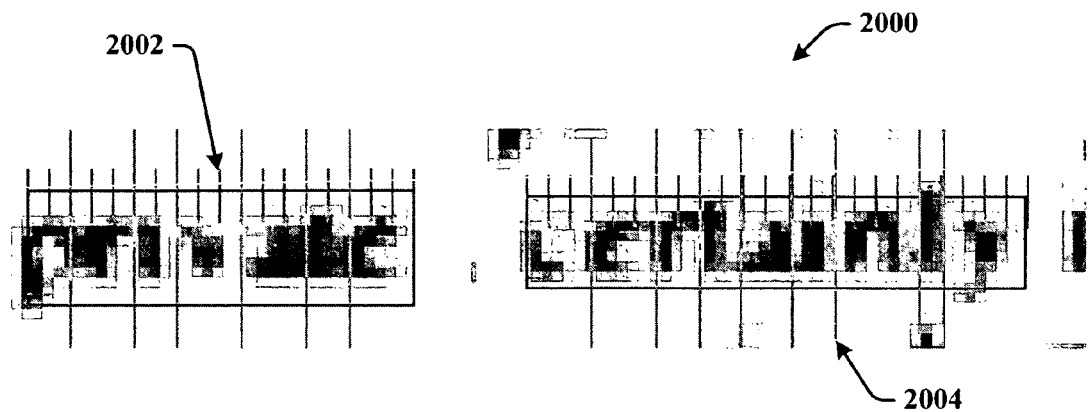
FIG. 20 illustrates a sample word segmentation in accordance with the present invention.

Referring now to FIG. 20, there is illustrated a sample word segmentation 2000 in accordance with the present invention. The small hashmarks 2002 indicate the gap size for segmenting a word. The larger hashmarks 2004 indicate the gaps actually used for each of the letters in the words "private" and "certainly".

Language Models

In one implementation, the word recognizer has no particular language model built in (language neutral), but simply attempts to produce the most likely interpretation of a sequence of character recognizer observations. This recognizer uses a simple 1-dimensional dynamic programming algorithm where the objective function to be maximized is simply the sum of the character scores. The character score is the probability for the most likely character (as returned by the character recognizer), multiplied by a scaling factor that depends on how much the most likely character's average width differs from the width of the portion of the image being considered for this character. Each cell in the dynamic programming table contains the letter for that endpoint of the solution, a link back to the previous letter and the cumulative score for solution so far. The (reversed) most likely string is recovered by tracing back through the table from the last entry.

Figure 21:
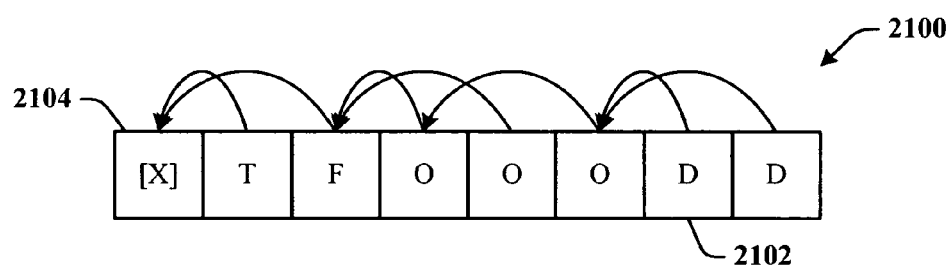
FIG. 21 illustrates a dynamic programming table in accordance with the present invention that is used to hold partial solutions of a dynamic programming problem when no language model is used.

Referring now to FIG. 21, there is illustrated a dynamic programming table in accordance with the present invention that is used to hold partial solutions of a dynamic programming problem when no language model is used. Typically, dynamic programming proceeds by filling in a table, where each cell in the table represents a subproblem of the original problem. For example, consider a (1-dimensional) table 2100 used to hold partial solutions of a dynamic programming problem. The table 2100 contains a cell 2102 for each gap in the input sequence. Each of these cells 2102 represents an endpoint, which is the optimal solution for the part of the word ending at the gap corresponding to that cell. Each solution is expressed in terms of the optimal solution to a smaller subproblem (as indicated by the associated arrow). In this example, the word is recognized as "FOOD". Each cell 2102 contains a measure of the fitness of that particular subproblem and a pointer back to a previous cell in the table 2100 representing the optimal solution for the part of the word prior to this letter. When the table 2100 has been filled completely, the last cell 2104 represents the optimal word for the entire sequence of observations.

Figure 22:
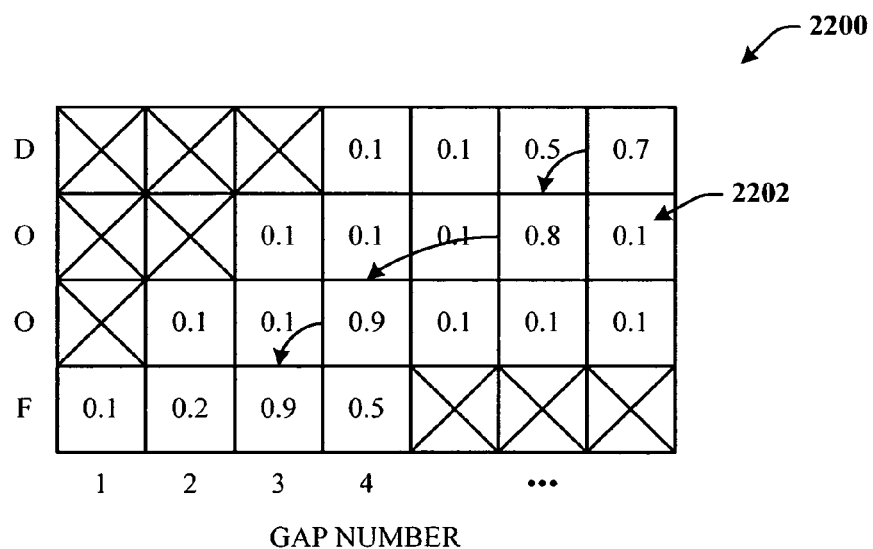
FIG. 22 illustrates a sample dynamic programming table for a dictionary model optimization in accordance with the present invention that is used to determine an optimal assignment of observations to letters in a particular word.

Referring now to FIG. 22, there is illustrated a sample dynamic programming table 2200 for a dictionary model optimization in accordance with the present invention that is used to determine an optimal assignment of observations 2202 to letters in a particular word. In one implementation, the word recognizer attempts to find out which word out of a dictionary of words is the most likely match for a given input image. If there is no sufficiently plausible word in the lexicon to describe the image, the system falls back on a previous method.

In a first implementation, a version of the dictionary-based recognizer is employed that simply scans linearly through the entire lexicon, evaluating the probability for each word, and outputting the most likely word. A second implementation describes an alternative organization that allows interleaving the dynamic programming optimization with the dictionary traversal to more quickly compute the most likely word.

In this problem, each column in the dynamic programming table 2200 represents the subproblems ending at a particular position (gap) in the input sequence, and each row of the table represents a letter from the word in question. An entry at column c and row r of the table 2200 represents a partially recognized word ending at gap c, and ending with the letter represented by row r. Stored in this table location is a pointer back to the previous letter and gap where that letter ends, as well as, a cumulative score.

A similar scoring method is used for the second implementation of the word recognizer—the probability that the observation matches the letter implied by the current cell, times a scaling factor that depends on the gap width and the average width for the character. Again, the cumulative score is the score for the current cell plus the cumulative score for the cell representing the previous partial solution. Once filling of the table has completed, the optimal score for the word is stored in the final (upper-right) cell. This score is then normalized by dividing by the number of letters in the word. Without this normalization, long words with relatively poorly scoring letters can accumulate high scores and beat out shorter words that have very good letter scores. Thus, it is desired to maximize the score for each letter.

Since many words in the dictionary share prefixes with other words, there is duplication of work by computing this shared information for each word. For example, consider a dynamic programming table employed to find the score for the word "FOOL". It has the same first three rows as the previous "FOOD" example. Thus, a way is desired to share these identical rows when computing scores for words with common prefixes.

Note that some cells do not need to be filled, since it is impossible for any character other than the first to occupy the first gap, and each letter can only be responsible for up to four gaps. The optimal path is represented by the arrows moving along cells with the highest observed values.

Figure 23:
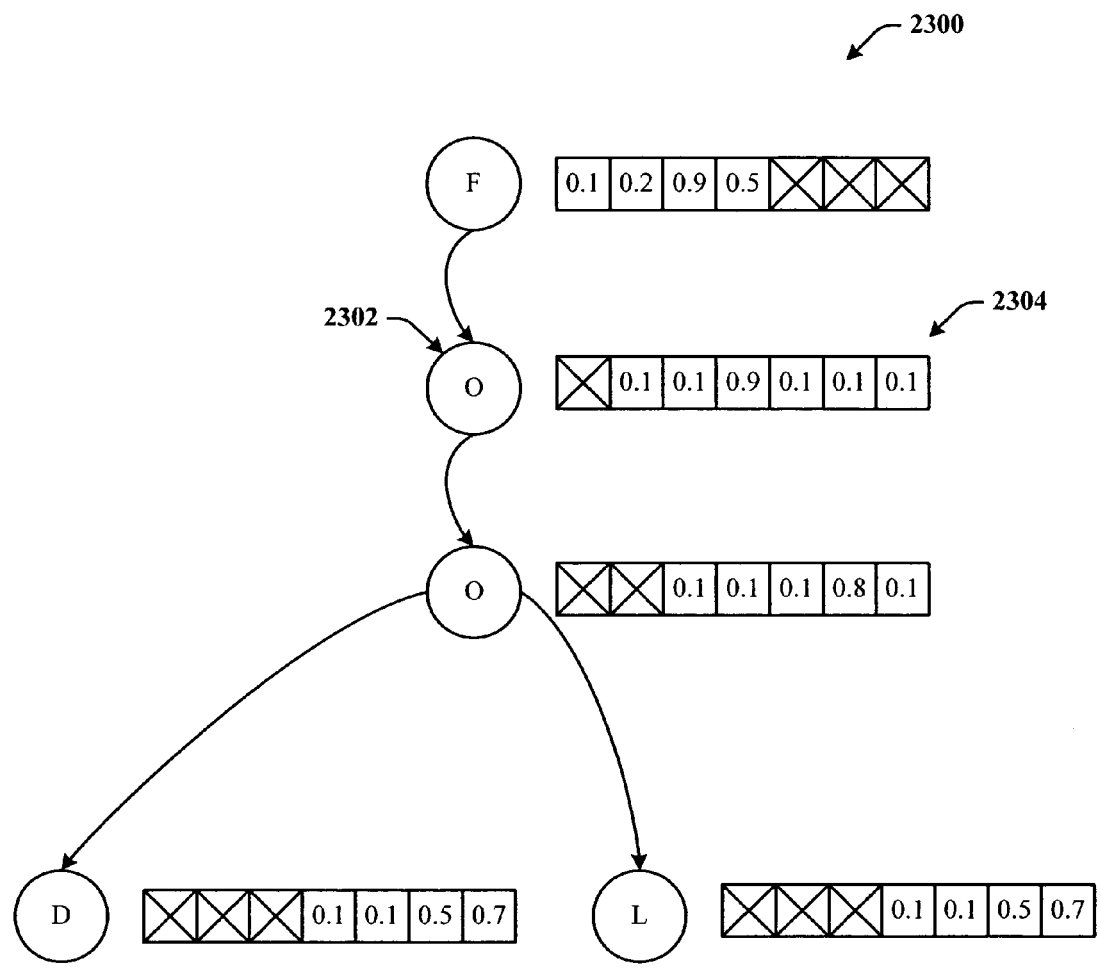
FIG. 23 illustrates a trie-based dictionary lookup diagram in accordance with the present invention.

Referring now to FIG. 23, there is illustrated a trie-based dictionary lookup diagram 2200 in accordance with the present invention. A trie (derived from reTRIEval) is a data structure or k-ary position tree structure for storing strings in which there is one node for every common prefix. The strings are stored in extra leaf nodes. Tries are used to implement a dictionary abstract data type (ADT) where basic operations like makenull, search, insert, and delete can be performed. They can be used for encoding and compression and, regular expression search and approximate string matching.

A solution is to create and evaluate one row of the table 2200 (of FIG. 22) at a time as the dictionary is traversed. To traverse the dictionary in an order that maximizes the amount of reused computation, the dictionary is arranged into the trie structure 2300. Any node 2302 in the trie 2300 represents either a partial word or a complete word (or, both—"fool" is a word and also a prefix of "foolish"). As the dictionary trie is traversed, the dynamic programming table is being constructed. When visiting a node, a new "row" 2304 is created for this virtual table 2300 that corresponds to the letter represented by that node in the trie, and the row is filled in with the scores.

Thus, the resulting trie 2300 has a top-level "F" node to which is associated the "F" row of values for the dictionary table 2200 of FIG. 22. Traversing downward, a second node (a first "O" node) has an associated first "O" row of the table 2200. Moving on, a third node (a second "O" node) has the corresponding row associated therewith from table 2200. This third node has a first branch that corresponds to a "D" node for the word "FOOD" and a second branch that corresponds to an "L" node for the word "FOOL". The "D" node is associated with the "D" row from table 2200. A similar, but lower row valuation is made and associated with the "L" node.

Note that the only context needed for this operation is the previous row, which is passed as a parameter to the recursive trie traversal routine. If the node in question represents a full word, the last entry in the row can be observed to find the sum of the scores for the letters in that word. Again, the sum of letter scores is divided by the length of the word to derive the final word score. When the trie traversal finishes, the highest-scoring word encountered is returned.

There are a few heuristic optimizations that speed up the computation immensely. First, only visit the words starting with letters that are likely to be the initial letter for the word. This optimization provides a several-fold increase in speed, especially for words that begin with uncommon letters. Another speedup comes from pruning the search so that links in the trie that are unlikely to result in a high-scoring word are not followed. If the average score for the letters of the word prefix at a given node (the value in the final entry of the column, divided by the number of letters) is worse than some threshold, it is assumed that no matter how well the remaining letters of the word score, they will never be good enough to make the average beat the best word seen so far. This second optimization provides a significant increase in speed without noticeably compromising the results.

Figure 24:
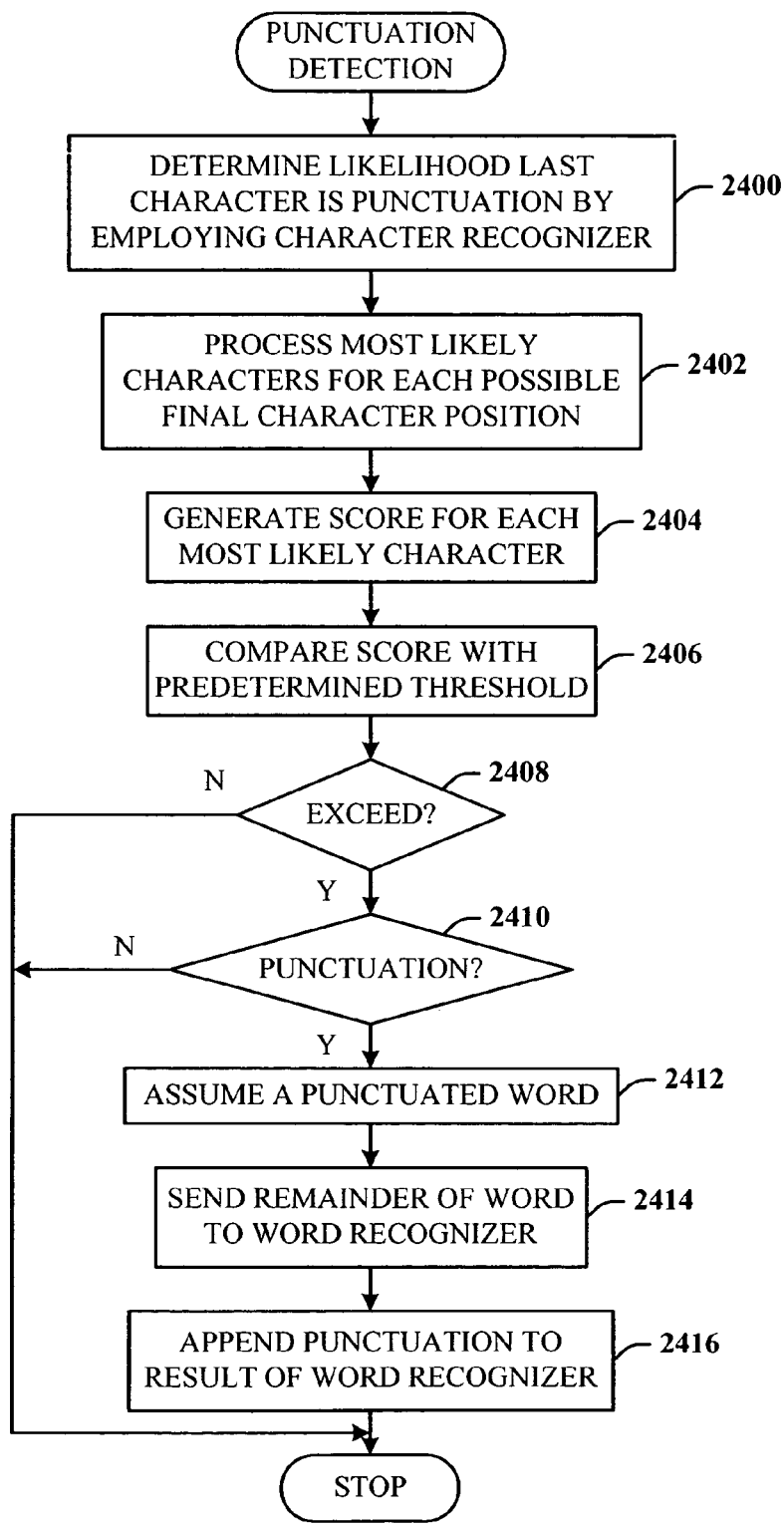
FIG. 24 illustrates a methodology of punctuation detection in accordance with the present invention

Punctuation poses a problem to the dictionary-based word recognizer, in that words with trailing punctuation may not be present in the lexicon. Referring now to FIG. 24, there is illustrated a methodology of punctuation detection in accordance with the present invention. Before a sequence of recognition locations is passed to the word recognizer, the system determines the likelihood that the last character of the word is punctuation, as indicated at 2400. If so, the character recognizer is used to identify the particular punctuation. In order to determine if the final character is punctuation, the system looks at the most likely character for each possible final character position, as indicated at 2402. At 2404, a score is generated for each most likely character. At 2406, the each score is compared to a predetermined threshold. At 2408, the system determines if the score has exceeded the threshold. If the highest score among these character recognizer outputs is above a threshold, flow is to 2410 to also consider if the character is most likely punctuation. If both, flow is to 2412 where it is assumed to be a punctuated word. The remainder of the word is then sent to the dictionary-based recognizer, as indicated at 2414. At 2416, the punctuation is then appended to the result of the word recognizer. The process then reaches a Stop block. If the score does not exceed the threshold, or if it does, but is not considered punctuation, flow is from 2408 and 2410 to the Stop block.

Figure 25:
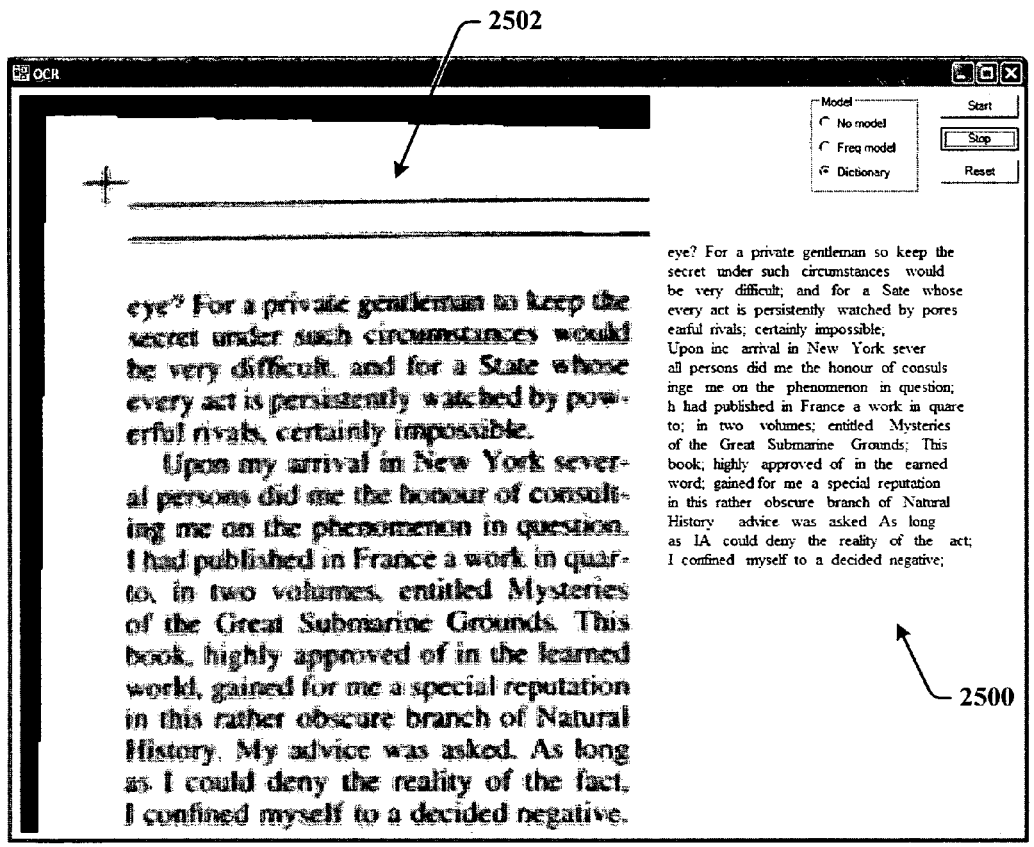
FIG. 25 illustrates the results of an imaged sample in accordance with the architecture of the present invention.

Referring now to FIG. 25, there are illustrated the results 2500 of an imaged sample 2502 in accordance with the architecture of the present invention. The processing is facilitated by a user interface that produces a window 2506 for viewing a side-by-side comparison of the imaged text 2502 and the processed results 2500. In this example, the system correctly OCR'd 104 of 118 characters and punctuation. The results are better if hyphenation is ignored, where the associated word fragments are not in the dictionary. In this particular interface, the user can select between no language mode, a frequency model, and the dictionary model.

Figure 26:
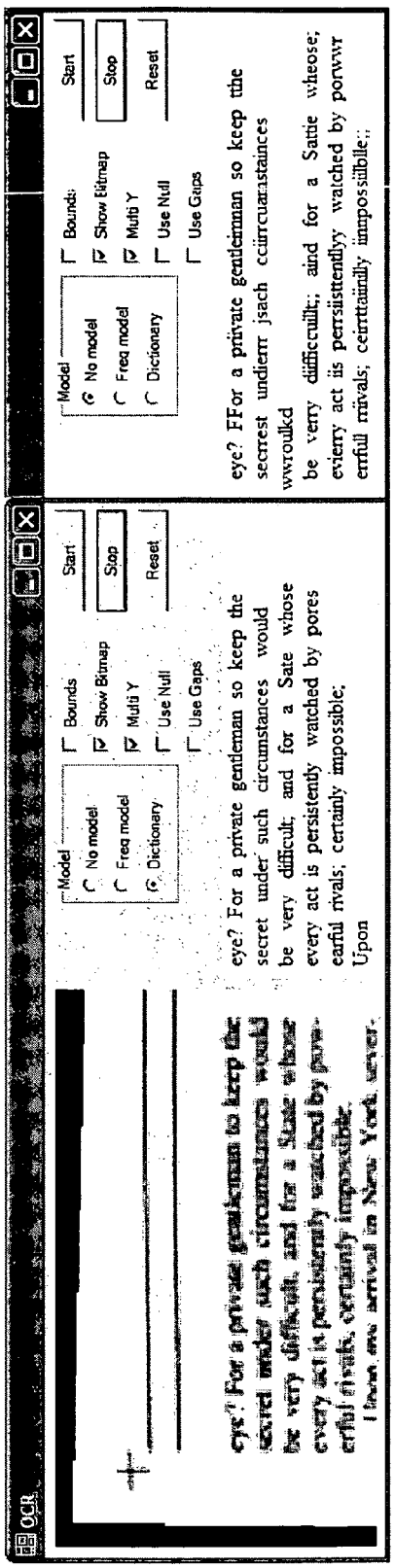
FIG. 26 illustrates a comparison of language models over a portion of imaged text in accordance with the architecture of the present invention.

Referring now to FIG. 26, there is illustrated a comparison of language models over a portion of imaged text in accordance with the architecture of the present invention. On the left, the dictionary model was used, and shows a much higher recognition rate than shown on the right, which does not use a model.

Classifier

As indicated hereinabove, the subject invention can employ various artificial intelligence based schemes for carrying out various aspects of the subject invention. For example, a process for determining a threshold for determining if a character is punctuation can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to the following: determining the substantive context of the document in order to better resolve the recognized symbol; and perform bi-gram, tri-gram, etc., processing to increase the probability that the current word is correct. For example, if the word is initially recognized as "wosd", the previous or following word (bi-gram) could also be processed. If the following word is processor, it is more likely that "wosd" should be "word".

In another implementation, the word content can be analyzed to further the recognition rate. For example, if the word is money, and a later recognized word is securities, and inference can be made that the content may be dealing with finances, securities, or the like. Thus, the system can automatically enable one or more language models that include terms and/or capabilities related to resolving such terms. Moreover, such language model modularization facilitates reduced data requirements in that if the computing device in which the novel architecture is employed is utilized in principally a financial environment, only such language module(s) need be installed or made available in the device. This is in contrast to provide a catchall language model that may overly burden storage capabilities and/or processing capabilities of the device in which is it installed.

In yet another implementation, the classifier can be employed to estimate the number of symbols to be resolved and infer, that if the number of symbols is two, for example, it is more than likely that the word is a pronoun or article. Consequently, such related word preprocessing can be employed before other language models would be enabled.

The classifier can also be used to automatically adjust the thresholds used for determining punctuation, and other symbols to be recognized. This adjustment can be based on the correctly recognized content at the OCR process proceeds. That is, there is a feedback mechanism that automatically impacts the threshold based on history.

The threshold can also be automatically adjusted based on the importance of the content. For example, as the OCR process proceeds, if it is determined that the recognized words are becoming more and more related to a legal contractual document, the classifier can cause the system to raise the threshold to improve the accuracy (also, for medical records, for example), and even to rerun the process, if desired. Whereas, if the content is determined to be more related to a grocery list, the threshold could be relaxed as the OCR process continues.

Many other uses for the classifier include making inferences based on the size of the symbol, type of punctuation, length of sentences, the type of symbol relative to its location in a string of symbols, etc.

Note that the novel architecture is not restricted to employing a convolutional neural network for character recognition. One can employ a process of computing or fully classifying the results on each position on the document, and get dynamic programming without convolutional processing. However, in a less robust implementation, this could impact system performance.

Figure 27:
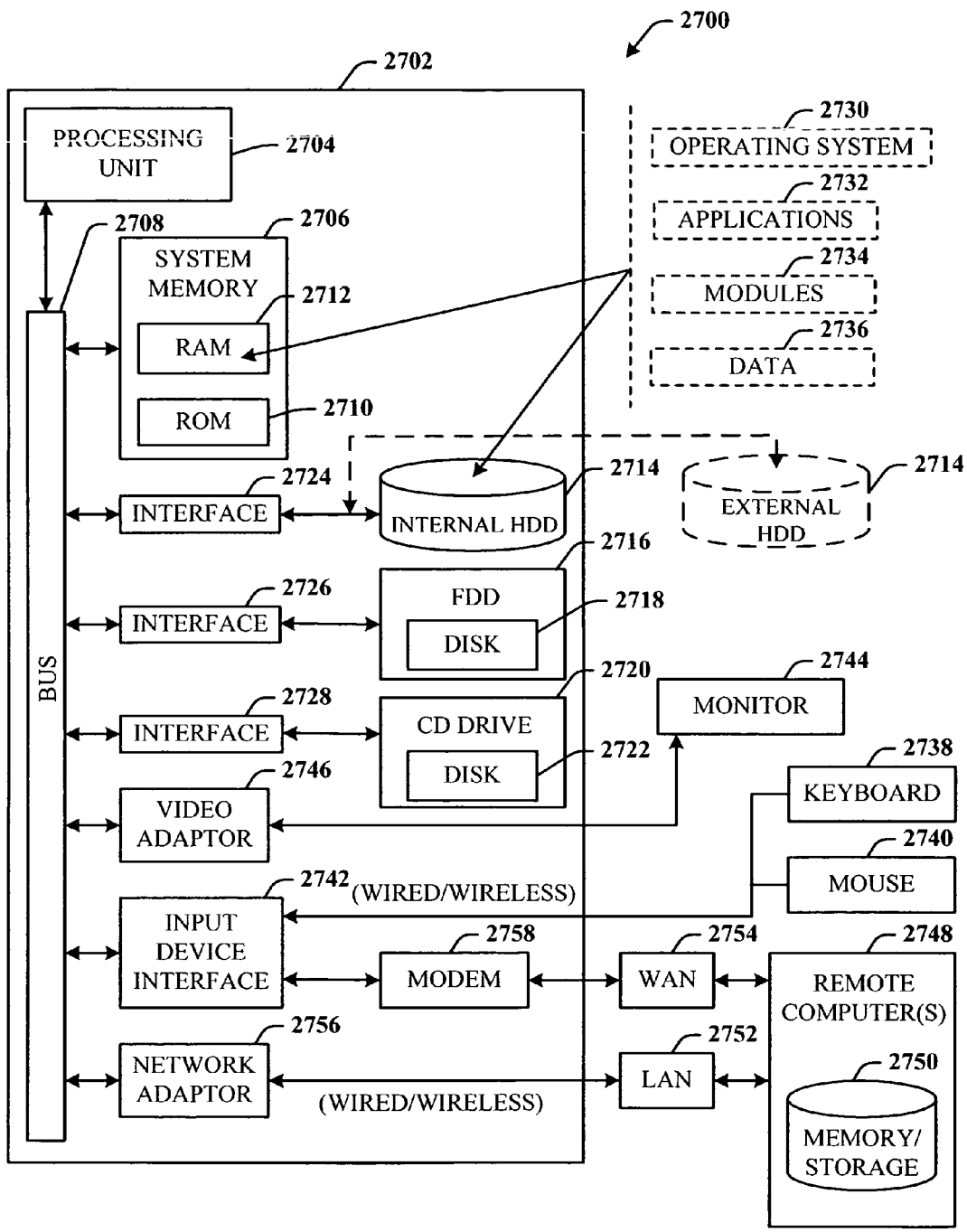
FIG. 27 illustrates a block diagram of a computer operable to execute the disclosed architecture.

Referring now to FIG. 27, there is illustrated a block diagram of a computer operable to execute the disclosed architecture. In order to provide additional context for various aspects of the present invention, FIG. 27 and the following discussion are intended to provide a brief, general description of a suitable computing environment 2700 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 27, there is illustrated an exemplary environment 2700 for implementing various aspects of the invention that includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712.

It is appreciated that the present invention can be implemented with various commercially available operating systems or combinations of operating systems.

A user can enter commands and information into the computer 2702 through one or more wired/wireless input devices, e.g., a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 via an interface, such as a video adapter 2746. In addition to the monitor 2744, a computer typically includes other peripheral output devices (not shown), such as speakers, printers etc.

The computer 2702 may operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756. When used in a WAN networking environment, the computer 2702 can include a modem 2758, or is connected to a communications server on the LAN, or has other means for establishing communications over the WAN 2754, such as by way of the Internet. The modem 2758, which can be internal or external and a wired or wireless device, is connected to the system bus 2708 via the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 28:
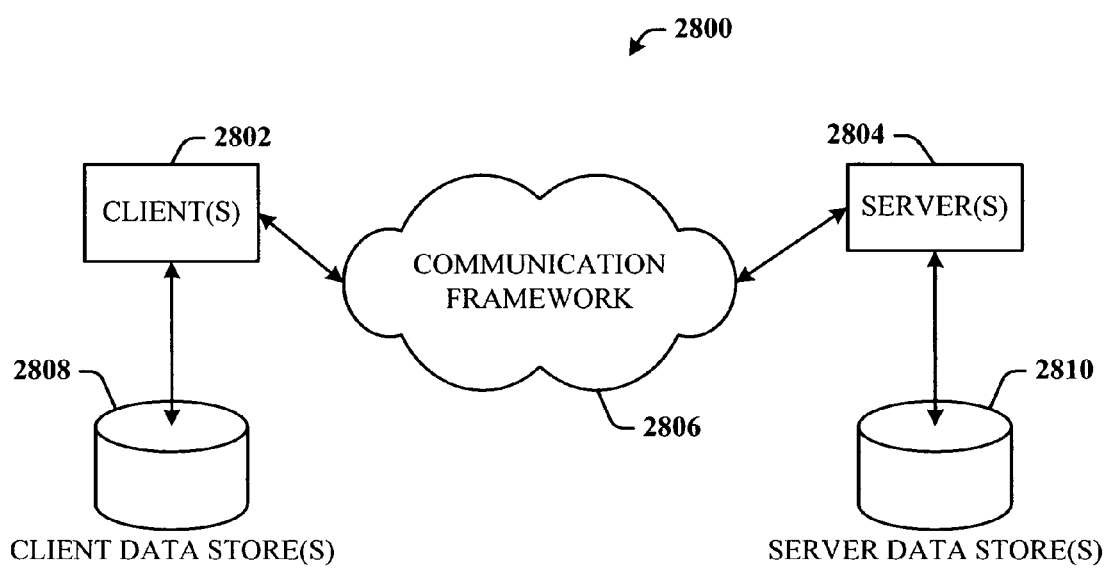
FIG. 28 illustrates a schematic block diagram of an exemplary computing environment in accordance with the present invention.

Referring now to FIG. 28, there is illustrated a schematic block diagram of an exemplary computing environment 2800 in accordance with the present invention. The system 2800 includes one or more client(s) 2802. The client(s) 2802 can be hardware and/or software (e.g., threads, processes, computing devices). The client(s) 2802 can house cookie(s) and/or associated contextual information by employing the present invention, for example. The system 2800 also includes one or more server(s) 2804. The server(s) 2804 can also be hardware and/or software (e.g., threads, processes, computing devices). The servers 2804 can house threads to perform transformations by employing the present invention, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical character recognition system that facilitates text recognition on a low resolution image, comprising:
    at least one processor that executes:
    a layout analysis component that determines a set of text lines in the low resolution image, the layout analysis component further segments each text line in the set of lines into individual text words, wherein the layout analysis employs at least two linear filters at each location of the low resolution image;
    a character recognition component that segments the individual text words into one or more character portions and provides an observation on the most probable character for each of the one or more character portions; and
    a word recognizer that employs dynamic programming mechanisms to ascertain words based upon a series of observations from the character recognition component.

2. The system of claim 1, further comprising a preprocessor component that receives the low resolution image of a text document.

3. The system of claim 2, the preprocessor component employs an adaptive whitebalancing algorithm to maximize contrast locally over regions of the low resolution image.

4. The system of claim 1, the layout analysis component utilizes connected component analysis mechanisms to facilitate determination of the set of text lines.

5. The system of claim 1, the layout analysis component employs at least two linear filters at each location of the low resolution image.

6. The system of claim 1, the at least two linear filters includes at least a first filter configured to identify gaps between text and a second filter designed to identify lines of text.

7. The system of claim 1, the at least two linear filters include thresholds such that locations of the low resolution image that evaluate above the threshold are identified as text.

8. The system of claim 1, the layout analysis component performs a connected components analysis on gaps identified by the at least two linear filters to generate gap connected components, the layout analysis component verifies geometric alignment between gap connected components to ascertain a text line in the low resolution image.

9. The system of claim 1, the layout analysis component identifies columns of whitespace within each text line to determine individual text words within the text line.

10. The system of claim 9, the layout analysis component employs a threshold to determine whitespace, the threshold is established as a function of a minimum and a maximum brightness value along a text line.

11. The system of claim 1, the character recognition component employs a convolutional neural network to provide the observation.

12. The system of claim 11, the convolutional neural network extracts simple features of a character portion at a higher resolution and converts the extracted features into more complex features at a coarse resolution.

13. The system of claim 1, further comprising a language model that facilitates word recognition.

14. The system of claim 13, the language model is a dictionary model that includes an entire lexicon, the word recognition component scans through the lexicon, evaluates a probability for each word of the lexicon based upon correspondence to the series of observations and outputs a word with a highest probability.

15. The system of claim 13, the language model is language neutral and provides an interpretation of the series of observations from the character recognition component with the highest probability of correctness.

16. A computer-implemented method for performing optical character recognition on a low resolution image, comprising:

receiving a low resolution image of a text document;
a processor for implementing the following steps:
identifying lines of text in the low resolution image to generate a set of text lines;
partitioning each text lines in the set of text lines into a plurality of text words;
segmenting each text word into character portions;
determining an observation that includes a probable character imaged in the character portion of the low resolution image, wherein determining the observation comprises employing a convolutional neural network;
and employing dynamic programming techniques to evaluate a series of observations related to probable characters to provide a word determination.

17. The method of claim 16, determining the observation comprises employing a convolutional neural network.

18. The method of claim 16, further comprising training the convolutional neural network to accurately recognize text characters.

19. The method of claim 16, further comprising utilizing a language model to facilitate the word determination.

20. An optical character recognition system, comprising:
at least one processor coupled to memory, the at least one processor configured to act as:
means for receiving a low resolution image of a text document;
means for identifying lines of text in the low resolution image to generate a set of text lines;
means for partitioning each text lines in the set of text lines into a plurality of text words;
means for segmenting each text word into character portions;
means for determining an observation that includes a probable character imaged in the character portion of the low resolution image, wherein the means for determining the observation comprises employing a convolutional neural network;
and means for employing dynamic programming techniques to evaluate a series of observations related to probable characters to provide a word determination.

* * * * *